US012455889B1

(12) United States Patent
Siegfried et al.

(10) Patent No.: US 12,455,889 B1
(45) Date of Patent: Oct. 28, 2025

(54) QUANTIFYING AND VALIDATING HUMAN CREATIVE INPUT IN AI-GENERATED CONTENT

(71) Applicant: Official Technologies, Inc., Seattle, WA (US)

(72) Inventors: David Merritte Siegfried, Seattle, WA (US); John Francis Pletka, Alpharetta, GA (US)

(73) Assignee: Official Technologies, Inc., Seattle, WA (US)

( * ) Notice: Subject to any disclaimer, the term of this patent is extended or adjusted under 35 U.S.C. 154(b) by 0 days.

(21) Appl. No.: 19/098,212

(22) Filed: Apr. 2, 2025

(51) Int. Cl.
*G06F 16/00* (2019.01)
*G06F 16/2457* (2019.01)

(52) U.S. Cl.
CPC .............................. *G06F 16/24578* (2019.01)

(58) Field of Classification Search
CPC .................................................. G06F 16/24578
See application file for complete search history.

(56) References Cited

U.S. PATENT DOCUMENTS

| | | | | |
|---|---|---|---|---|
| 10,521,832 | B2* | 12/2019 | Zhu ..................... | G06Q 30/0277 |
| 11,481,386 | B2* | 10/2022 | Tsun .................. | G06Q 30/0251 |
| 11,682,152 | B1* | 6/2023 | Blumer ................ | H04L 65/403 |
| | | | | 345/619 |
| 12,056,510 | B2* | 8/2024 | Duffy ..................... | A63F 13/67 |
| 12,073,438 | B2* | 8/2024 | Gerber ............... | G06Q 30/0277 |
| 12,094,020 | B1 | 9/2024 | Morten | |
| 2009/0164394 | A1* | 6/2009 | Multerer ................ | G06Q 10/10 |
| | | | | 706/12 |
| 2014/0283123 | A1 | 9/2014 | Lonstein et al. | |
| 2014/0289663 | A1* | 9/2014 | Zhang ..................... | G06T 15/02 |
| | | | | 715/771 |
| 2018/0143741 | A1* | 5/2018 | Uriostegui .............. | G06F 16/48 |
| 2020/0176117 | A1 | 6/2020 | Lee et al. | |
| 2020/0265526 | A1* | 8/2020 | Ogunsusi ............. | G06Q 50/265 |
| 2021/0342962 | A1* | 11/2021 | Budlong ................ | G06Q 10/06 |
| 2021/0357451 | A1 | 11/2021 | Wold | |
| 2022/0027407 | A1 | 1/2022 | Ikezoye et al. | |

(Continued)

OTHER PUBLICATIONS

Sreejith Menon, "How AI and Machine Learning Revolutionize Software License Management", Nov. 21, 2023, 3 pages.

(Continued)

*Primary Examiner* — Noosha Arjomandi
(74) *Attorney, Agent, or Firm* — John W. Branch; Branch Partners PLLC

(57) ABSTRACT

Embodiments quantify and validate human creative input in AI-generated content. A portion of creative actions that cause modifications to an artwork may be determined. Records may be generated based on the creative actions such that each record may include attributes associated with the creative actions. A journal associated with the records may be generated. A creativity score for the modified artwork may be generated based on the journal such that each record included in the journal may be associated with a partial creativity score that contributes to the creativity score. Creativity models may be employed to determine an amount of change to the modified artwork caused by the portion of the creative actions based on the creativity score and the journal. A report may be generated based on the determined amount of change.

28 Claims, 14 Drawing Sheets

(56) References Cited

U.S. PATENT DOCUMENTS

| | | | |
|---|---|---|---|
| 2022/0229675 A1* | 7/2022 | Duffy | A63F 13/67 |
| 2022/0230626 A1* | 7/2022 | Duffy | G16H 50/20 |
| 2023/0244710 A1 | 8/2023 | Wold et al. | |
| 2024/0243919 A1* | 7/2024 | Olsen | H04L 9/3247 |
| 2024/0362236 A1* | 10/2024 | St. Martin | G06F 16/24578 |
| 2025/0141857 A1* | 5/2025 | Lu | H04L 63/08 |

OTHER PUBLICATIONS

Jammaround, Inc, "AI and Copyright protection in the Music Industry", Jun. 19, 2023, 12 pages.

Office Communication for U.S. Appl. No. 18/413,616 mailed May 8, 2024, 11 Pages.

Office Communication for U.S. Appl. No. 18/413,616 mailed Jul. 31, 2024, 9 Pages.

* cited by examiner

QUANTIFYING AND VALIDATING HUMAN CREATIVE INPUT IN AI-GENERATED CONTENT

TECHNICAL FIELD

These innovations relate generally to data management, and more particularly, but not exclusively, to quantifying and validating human creative input in AI-generated content.

BACKGROUND

Increasingly, generative artificial intelligence, machine learning, other artificial intelligence, or the like, are being employed as part of the creative process in graphic design, illustration, video production, music production, or other artistic endeavors. Further it is becoming more common for authors, artists, designers, or other creators to employ AI (artificial intelligence) systems as part of their creative process. Accordingly, in some cases, the line between machine generation and human creativity may become blurred. In some cases, this may impact the creative maker space or markets by making it difficult to determine or evaluate if a creative project is the product of human creativity or a product of a machine. Accordingly, in some cases, determining or evaluating questions of human created works versus machine created works, or the like may be difficult absent an objective means for evaluating the level of human creativity used to create various works. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
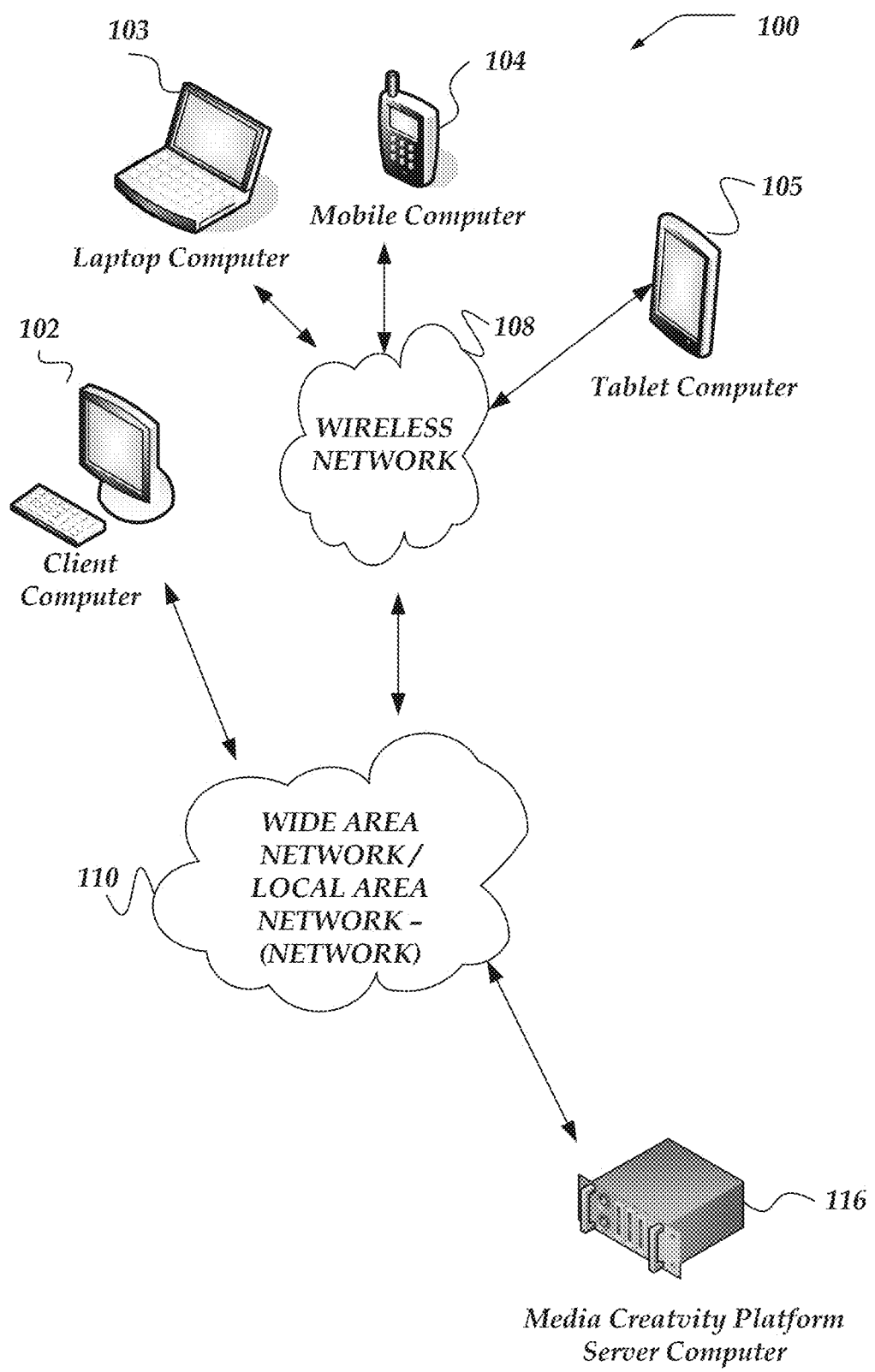
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PUP, Perl, Python, R, *Julia*, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable mediums or computer storage devices and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the term "prompt" refers to one or more data structures that contain or represent prompt information that may be provided to LLMs.

As used herein, the terms "generative artificial intelligence," or "generative AI" refers a category of artificial intelligence system that encompasses systems capable of creating new content, not limited to just text but also images, audio, video, code, or other data types. Generative artificial intelligence is generally assumed to include large language models, as well as other types of models that may generate content responsive to input prompts.

As used herein, the term "artwork" refers to human or machine created content (or combination thereof) that may include one or more of a video, an image, a graphic, a design, an illustration, a picture, text, a sculpture, software, audio, or the like. Machine generated artwork may be modified by creative human interactions such that an artwork that was generated initially by a generative artificial intelligence system, or the like may be considered human created if a user executes sufficient modifications driven by human creative actions.

As used herein, the term "creative action" refers to interactions or behaviors associated with the human creative process. Creative actions include various actions the users may employ modify an artwork. Creative actions include various actions or events that may not directly modify an artwork, such as dwell time (thinking time), tool selection, undo operation, redo operations, or the like.

As used herein, the terms "creative action record," or "record" refer to one or more data structures the represent one or more creative actions. Creative action records may include fields or attributes that capture the characteristics or metrics associated with creative actions. Generally, there may be one-to-one relationship between creative actions and creative action records but, in some cases, a creative action record may include information for more than one creative action.

As used herein, the terms "creative action journal," or "journal" refer to one or more data structures that may be employed to associated creative action records with an artwork. Creative action journals provide a catalog of each creative action record associated with each creative action that was applied to an artwork. Creative action journals may logically be considered or represented as trees, graphs, linked lists, or the like, such as the order of execution of the included creative action records may be preserved.

As used herein, the term "project" refers to one or more data structures used for associating one or more artworks with creative action journals, creative action records, or other meta-data. A project may include the artworks, creative action journals for those artworks, creative action records for the associated creative action journals, or other meta-data including ownership, attribution, license information, creation date, creator/author information, image resolution, file format, file size, or the like.

As used herein, the term, "configuration information" refers to information that may include rule based policies, pattern matching, scripts, computer readable instructions, or the like, that may be provided from various sources, including, configuration files, databases, user input, built-in defaults, or the like, or combination thereof. In some cases, configuration information may include or reference information stored in other systems or services, such as configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to quantifying and validating human creative input in AI-generated content. In one or more of the various embodiments, one or more creative actions associated with an artwork may be monitored.

In one or more of the various embodiments, a portion of the one or more creative actions that cause one or more modifications to the artwork may be determined such that the one or more creative actions may be executed by a user.

In one or more of the various embodiments, one or more records (creative action records) may be generated based on the one or more creative actions such that each record may include one or more attributes associated with the one or more creative actions.

In one or more of the various embodiments, a journal (creative action journal) associated with the one or more records may be generated such that the journal may be arranged based on one or more of a timestamp, a portion of the artwork, a type of the one or more creative actions, or the like.

In one or more of the various embodiments, a creativity score for the modified artwork may be generated based on the journal such that each record included in the journal may be associated with a partial creativity score that contributes to the creativity score.

In one or more of the various embodiments, one or more creativity models may be employed to determine an amount of change to the modified artwork caused by the portion of the one or more creative actions based on the creativity score and the journal.

In one or more of the various embodiments, a report may be generated based on the determined amount of change such that one or more portions of the report are arranged for display based on the creativity score.

In one or more of the various embodiments, a second portion of the one or more creative actions may be determined based on one or more selections or deselections of one or more tools such that the one or more tools include one or more of a graphic editing tool, a prompt editor, prompt template editor, an audio editing tool, a video editing tool, or the like. In one or more of the various embodiments, third portion of the one or more creative actions may be determined based on one or more of a tool operation, a dwell time between tool selection, a dwell time between tool operations, an undo operation, a redo-operation, or the like.

In one or more of the various embodiments, generating the one or more records may include: determining the one or more attributes associated with the one or more creative actions based on an execution of the one or more creative actions such that the one or more attributes may include one or more of a tool name, a tool type, a tool stroke, a tool specification, an author identifier, a copy of a current version of the artwork, a reference to a copy of the current version of the artwork, a group indicator, a layer indicator, a reference to a parent record, a reference to a child record, or the like; including the one or more attributes in the one or more records; or the like.

In one or more of the various embodiments, another portion of the one or more creative actions that are associated with one or more tools may be determined. In one or more of the various embodiments, a plurality of previously executed creative actions associated with the one or more tools may be determined. In one or more of the various embodiments, the other portion of the one or more creative actions may be compared with the plurality of previously executed creative actions such that one or more anomalous creative actions in the other portion of the one or more creative actions may be determined based on the comparison. In one or more of the various embodiments, the partial creativity score associated with a portion of the records that are associated with the one or more anomalous creative actions may be increased.

In one or more of the various embodiments, one or more metrics associated with the modified artwork may be determined such that the one or more metrics may include one or more of a count of creative actions associated with the modified artwork, a percentage of the artwork that is modified, a count of the number of pixels are changed in the modified artwork, a ratio of a portion of the modified artwork that is machine generated, an amount of user time expended modifying the artwork, or the like. In one or more of the various embodiments, the creativity score for the modified artwork may be updated based on the one or more metrics.

In one or more of the various embodiments, the artwork may include one or more of a graphic digital illustration, a digital image, a video, or a portion of digitized audio. Also, in some embodiments, one or more portions of the artwork may be machine generated.

In one or more of the various embodiments, a plurality of journals may be determined based on a plurality of other artworks such that a first portion of the plurality of journals may be associated with a first portion of the plurality of other artworks that may be determined to be human generated and such that a second portion of the plurality of journals may be associated with a second portion of the plurality of other artworks that may be determined to be machine generated.

In one or more of the various embodiments, the one or more creativity models may be trained based on the first portion of journals and the second portion of journals such that the one or more creativity models may be trained to predict human generated artwork.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, media creativity platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of a client computer may employ the browser application to perform various activities over a network (online). However, another application may also be used to perform various online activities.

Client computers 102-105 also may include at least one other client application that is configured to receive or send content to another computer. The client application may include the ability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, media creativity platform server computer 116, or other computers.

Client computers 102-105 may further be configured to include a client application that enables an end-user to log into an end-user account that may be managed by another computer, such as media creativity platform server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to media creativity platform server computer 116. Also, client computers may be arranged to enable users to display reports, interactive user-interfaces, results provided by media creativity platform server computer 116, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, creativity platform server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of media creativity platform server computer 116 is described in more detail below in conjunction with FIG. 3. Although FIG. 1 illustrates media licensing platform server computer 116 as a single computer, the innovations or embodiments are not so limited. For example, one or more functions of media licensing platform server computer 116, or the like, may be distributed across one or more distinct network computers. Moreover, in one or more embodiments, media licensing platform server computer 116 may be implemented using a plurality of network computers. Further, in one or more of the various embodiments, media licensing platform server computer 116 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
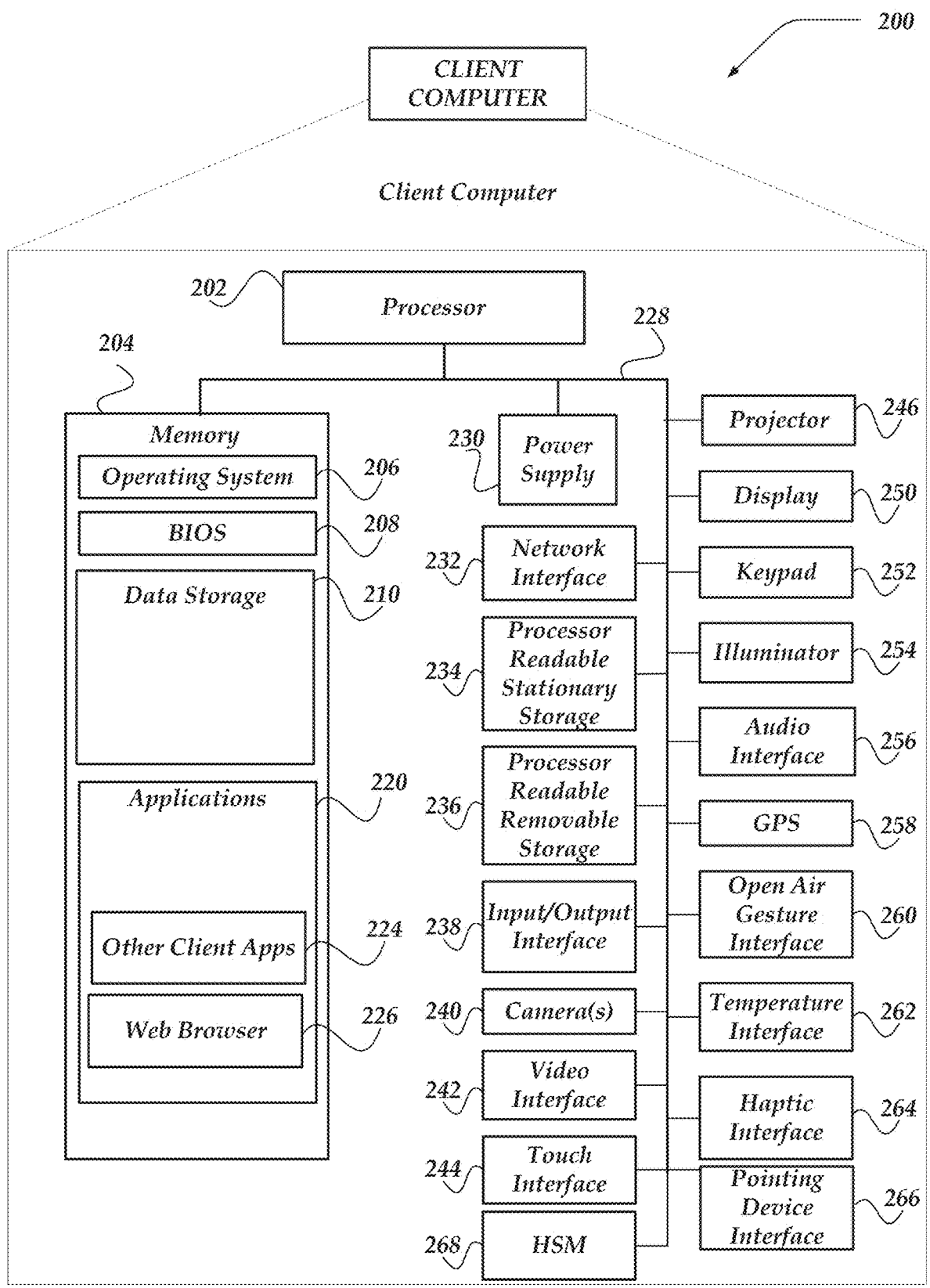
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen. Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
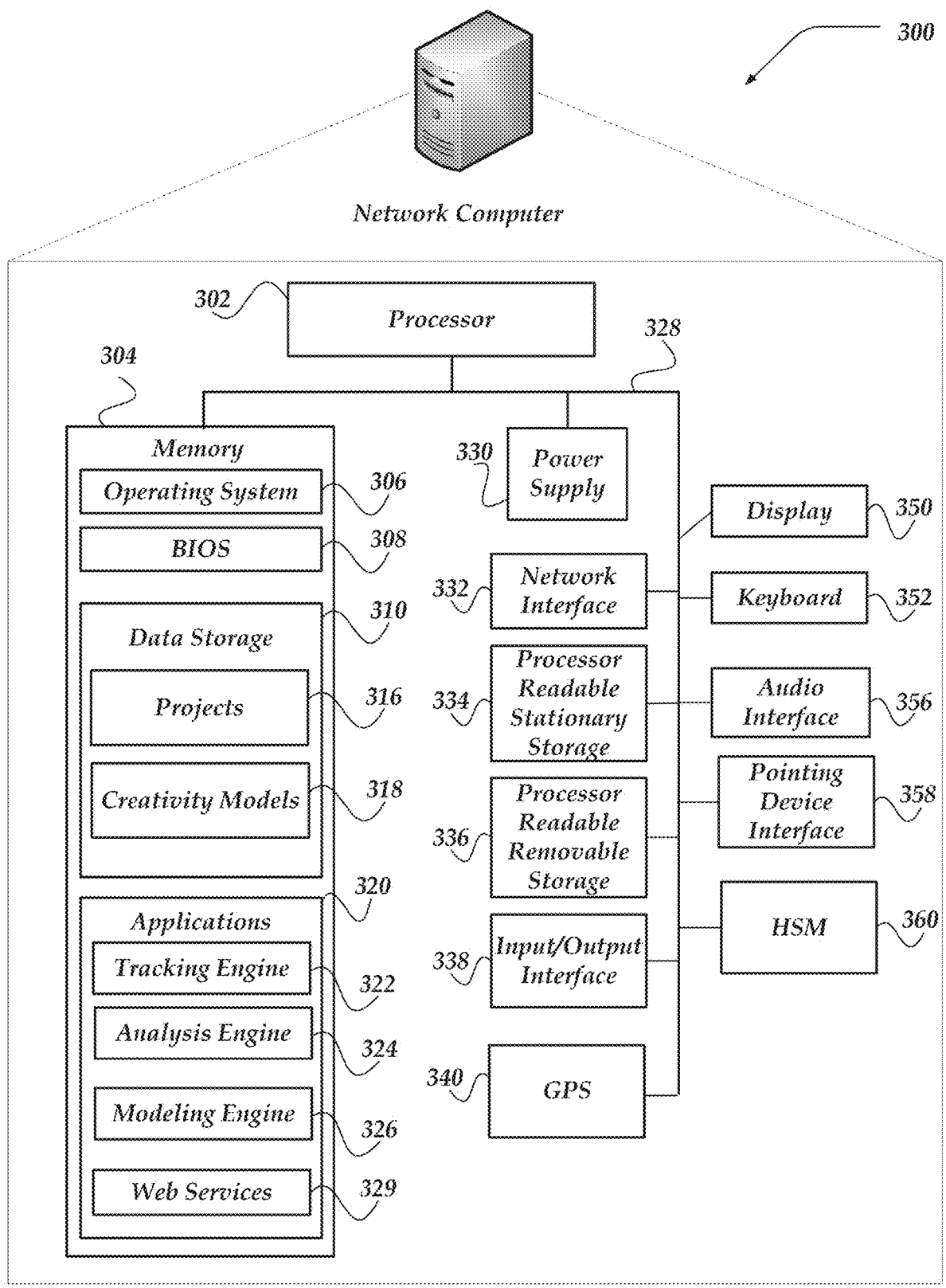
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of media licensing platform server computer 116 shown in FIG. 1.

As shown in the figure, network computer 300 includes a processor 302 that may be in communication with a memory 304 via a bus 328. In some embodiments, processor 302 may be composed of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for managing interactions with applications in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, tracking engine 322, analysis engine 324, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, selecting license rules for in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, projects 316, creativity models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include tracking engine 322, analysis engine 324, modeling engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, tracking engine 322, analysis engine 324, modeling engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to tracking engine 322, analysis engine 324, modeling engine 326, web services 329, or the like, may be provisioned and de-commissioned automatically.

Also, in one or more of the various embodiments, tracking engine 322, analysis engine 324, modeling engine 326, web services 329, or the like, may be located in one or more network computers or virtual computers rather than being tied to one or more specific physical network computers. Likewise, in some embodiments, one or more of tracking engine 322, analysis engine 324, modeling engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
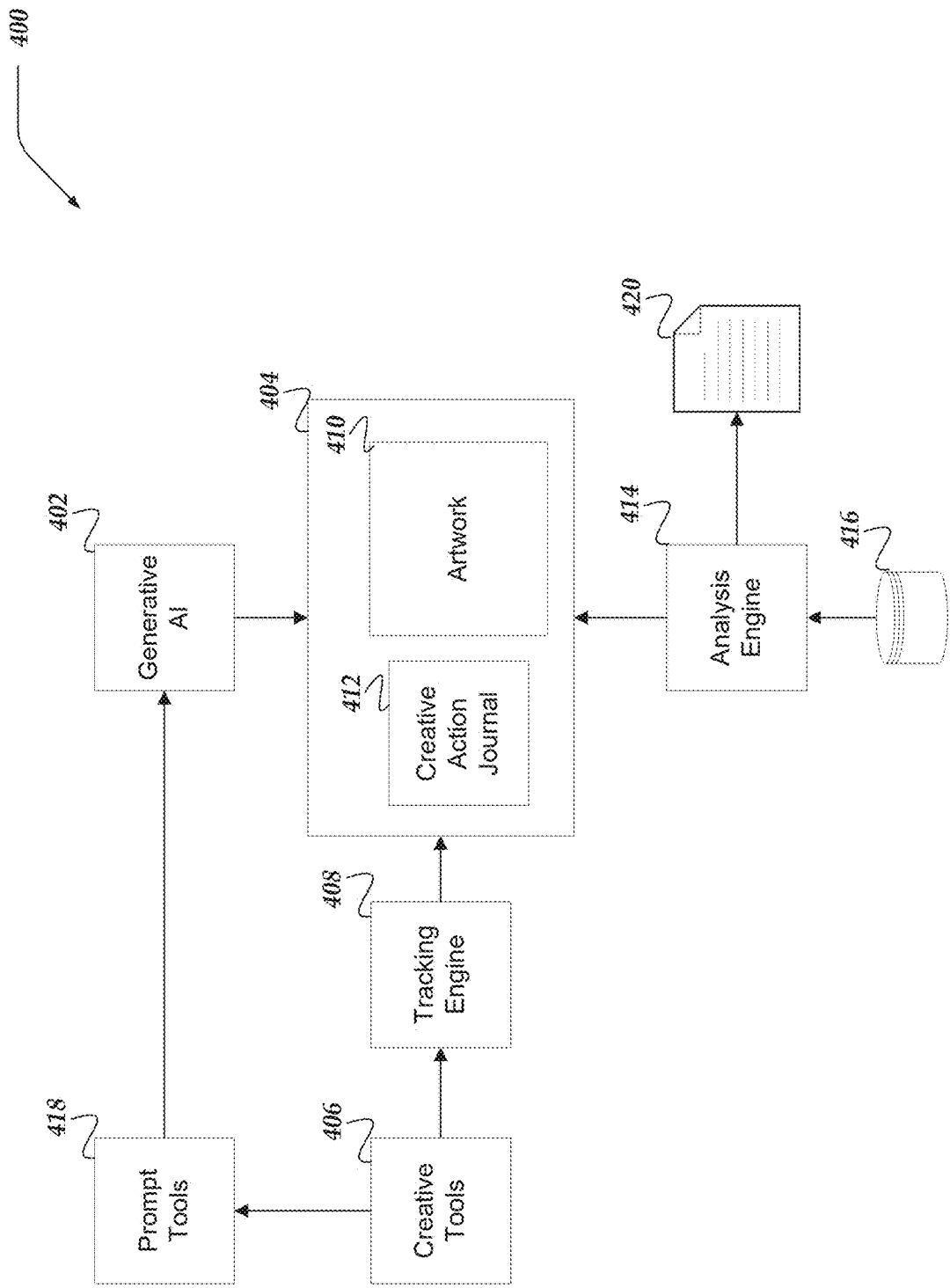
FIG. 4 illustrates a logical architecture of media creativity platforms for quantifying and validating human creative input in AI-generated content in accordance with one or more of the various embodiments.

FIG. 4 illustrates a logical architecture of media creativity platforms 400 for quantifying and validating human creative input in AI-generated content in accordance with one or more of the various embodiments.

In some embodiments, media creativity platforms may include a generative artificial intelligence source, such as generative artificial intelligence model 402, a project, such as project 404, a collection of creative tools, such as creative tools 406, a tracking engine, such as tracking engine 408, one or more artworks, such as artwork 410, an analysis engine, such as analysis engine 414, prompt tools, such as prompt tools 418, or the like.

In some embodiments, media creativity platforms may be arranged to enable one or more users (e.g., artists, designers, editors, or the like) to interactively or collaboratively generate projects that may include artwork that include some portions that may be generated by generative artificial intelligence systems or other AI systems. Accordingly, in some embodiments, media creativity platform 400 may enable users to employ prompt tools 418 to select or generate generative artificial intelligence prompts that may be provided to a generative artificial intelligence model, such as generative artificial intelligence model 402 to generate one or more artworks, such as artwork 410. In some embodiments, one or more prompts may be selected from lists or galleries of prompt options. In some cases, media creativity platforms may display labels or names of prompts rather than the entire prompt. Further, in some embodiments, media creativity platforms may be arranged to enable users to provide or edit complete prompts, prompt templates, or the like.

In some embodiments, media creativity platforms may be arranged to provide creative tools 406 that users may employ to modify or edit artwork 410. In some embodiments, creative tools may include digital graphics tools such as pens, paint brushes, color selectors, erasers, blend tools, fill tools, audio editing tools, video editing tools, or the like. Note, in some embodiments, the particular selection of creative tools may vary depending on user preferences, artwork media (e.g., graphics, audio, video, or the like), media creativity platform version, or the like. Accordingly, in some embodiments, media creativity platforms may be arranged to determine or present the particular creative tools based on rules, instructions, or the like, provided via configuration information to account for local circumstances, local requirements, or user preferences.

In some embodiments, media creativity platforms may be arranged to include tracking engines, such as tracking engine 408. In some embodiments, tracking engines may be arranged to monitor or track the users, creative interactions with artwork 410. For example, for some embodiments, tracking engines may be arranged to track tool selection, tool strokes, dwell time in between creative actions, or the like. In some embodiments, creative action journal 412 may represent data structures used for tracking the creative actions or activity that may be associated with artwork 410. Accordingly, in some embodiments, projects, such as project 404 may include one or more artworks and their corresponding creative action journal.

Also, in some embodiments, media creativity platforms may be arranged to include analysis engines, such as analysis engine 414. In some embodiments, analysis engines may be arranged to evaluate the quality or quantity of creative actions associated with an artwork in a project. In some embodiments, analysis engines may be arranged to monitor the occurrence or accumulation of creative actions that are applied to an artwork. Accordingly, in some embodiments, analysis engines may be arranged to continuously or periodically generate a creativity score (not shown here) that may be associated with an artwork or project. In some embodiments, creativity scores may be based on the creative actions executed by a user and directed to the artwork in the project. In some embodiments, partial creativity scores may be associated with various creative actions associated with the creative process. In some embodiments, different types of activity may be associated with different scores. For example, in some embodiments, media creativity platforms may be arranged to score modifications to features of an existing artwork portion differently than de novo modifications that may introduce new elements to the artwork. Thus, in some cases, an activity such as changing a color of an AI generated portion of the artwork may be assigned a lower creativity score than a hand drawn feature that is overlaid on an AI generated portion of the artwork. Likewise, for example, actions such as copy and pasting AI generated material may be scored lower than a user creating a pattern by manual digital stippling, or the like. Note, in some embodiments, the particular creativity score may be assigned to actions based on observation or experimentation. Further, in some cases, media creativity platform may employ machine-learning or other AI to infer or assign (partial) creativity scores to different creative actions.

In some embodiments, creativity scores may provide users with a quantitative indication of the amount of human creativity that may be included in the artwork. Accordingly, in some embodiments, creativity scores may be employed to quantify the amount of human creative input in an artwork that includes AI-generated content. In some embodiments, media creativity platforms may be arranged to determine an amount of change to the modified artwork caused by the portion of the one or more creative actions. Thus, in some embodiments, media creativity platforms may be arranged to map the amount of change to the level of human creativity represented in the modified artwork.

In some embodiments, media creativity platforms may be arranged to include one or more repositories, such as repository 416 for storing other projects that each include artwork, creativity scores, creative action journals, other meta-data, or the like. Accordingly, in some embodiments, analysis engines may be arranged to compare creativity scores or creative action journals with other projects that may be available in project repository 416. In some embodiments, one or more projects included in repository 416 may include artwork that has been granted a copyright, licensure, or other similar protections. Accordingly, in some embodiments, the generated creativity score for a current project may be compared to past projects that were determined to be eligible for copyright protection, licensure, or other classifications. Thus, in some embodiments, this score comparison enables users to evaluate the level of human creativity included in their current artwork as compared to previously generated artwork in the other projects.

Accordingly, in some embodiments, comparing the creativity scores of artwork that has been accepted or determined to meet one or more qualifications that may be associated with the amount of human creativity, such as eligibility for copyright protection, or the like, may provide a user insight into how the artwork may be received by regulatory bodies or agencies that may evaluate artwork for human creativity.

In some embodiments, media creativity platforms may be arranged to generate various reports regarding the project, such as report 420 that may be provided to one or more evaluating consultants, counselors, bodies or agencies. For example, if an art certification body may be reviewing an artwork for eligibility, the report may include descriptions or quantification of the creative actions that were executed during the generation of the artwork. In some embodiments, the creative actions represented in creative action journals and included in the reports may be employed to verify the particular actions that were performed to generate the artwork in the project. Further, in some embodiments, analysis engines may be arranged to generate referrals to professionals, such as copyright attorneys, art critics, review bodies, accreditation agencies, or the like, that may be retained to continue formal validation or certification of the artwork.

In some embodiments, media creativity platforms may be arranged to archive projects (e.g., artwork with creative action journal and other meta-data) to enable the level of human creativity to be validated or verified in the future. Accordingly, in some embodiments, projects, such as project 404 may be employed to verify the originality of completed works. For example, in some embodiments, the human creativity used to generate an artwork may be reviewed or evaluated based on the associated creative actions included in its creative action journal.

Figure 5A:
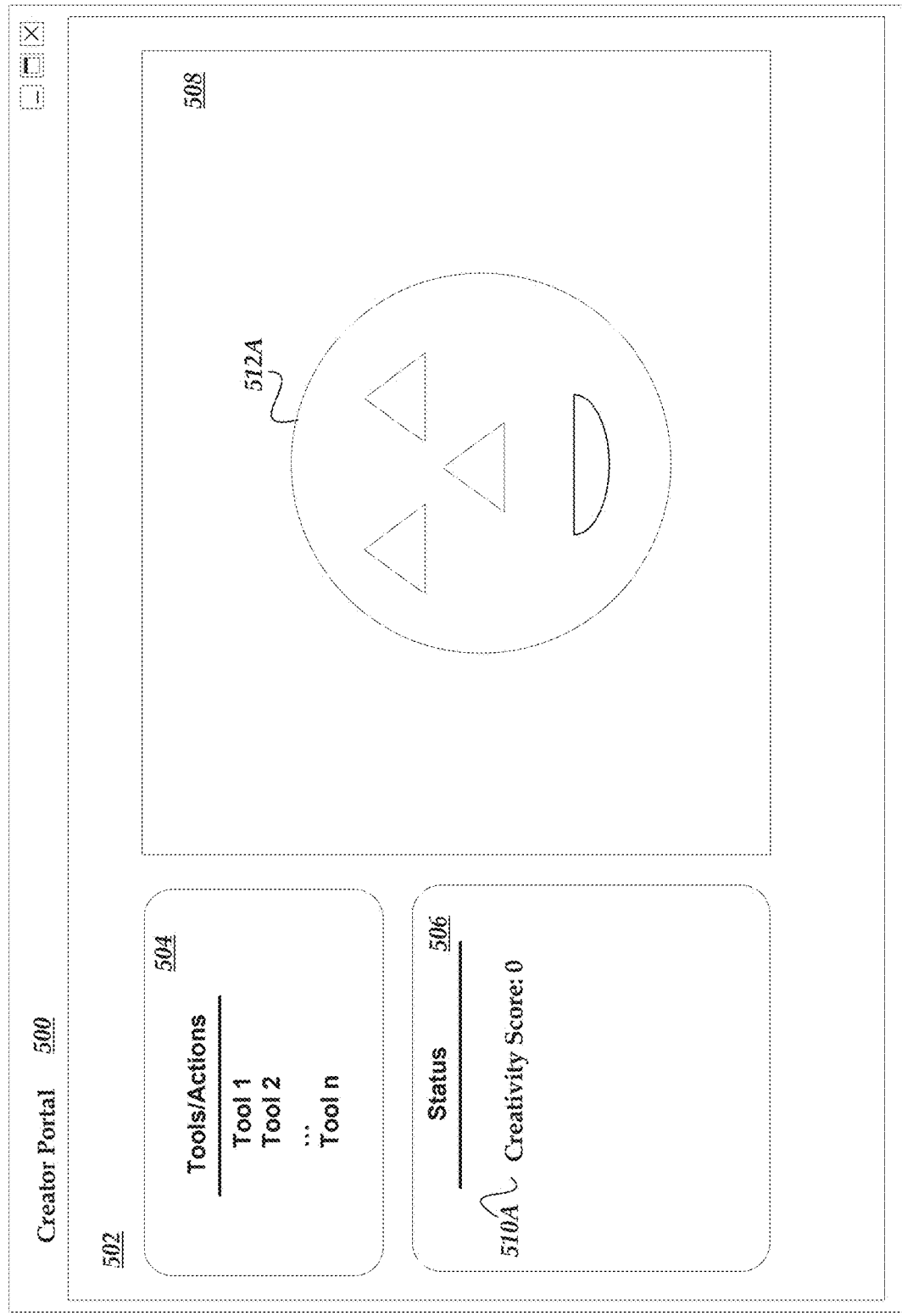
FIG. 5A illustrates a logical representation of a user interface for quantifying and validating human creative input in AI-generated content in accordance with one or more of the various embodiments.
Figure 5B:
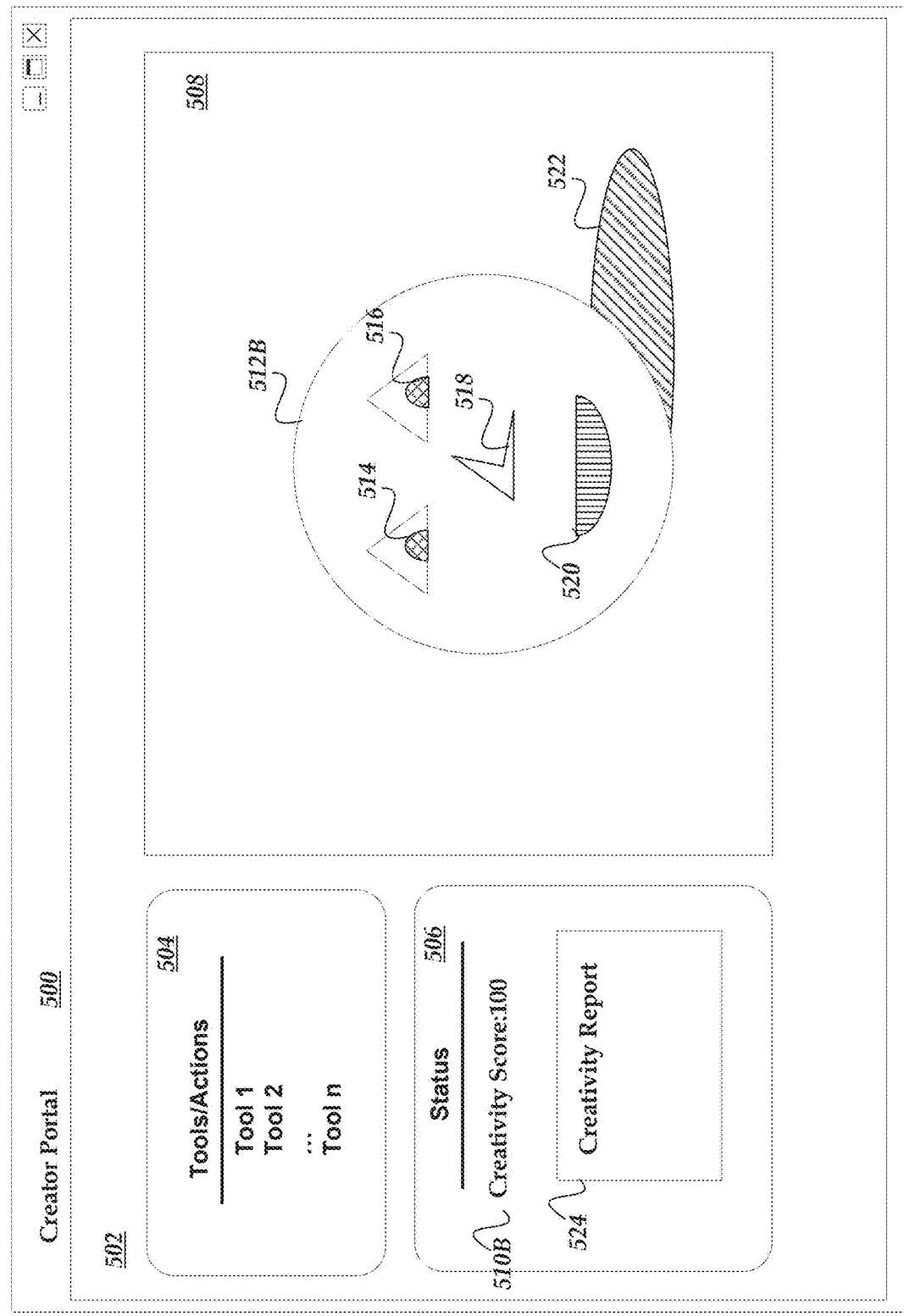
FIG. 5B illustrates a logical representation of a user interface for quantifying and validating human creative input in AI-generated content in accordance with one or more of the various embodiments.

FIG. 5A-5B illustrates a logical representation of quantifying and validating human creative input in AI-generated content in accordance with one or more of the various embodiments.

FIG. 5A illustrates a logical representation of user interface 500 for quantifying and validating human creative input in AI-generated content in accordance with one or more of the various embodiments.

As described above, media creativity platforms may provide one or more user interfaces that enable users to interactively generate or manipulate artwork, including artwork that includes AI generated content. Accordingly, in this example, user interface 500 includes various display panels, including workspace panel 502, tool panel 504, status panel 506, artwork panel 508, or the like. One of ordinary skill in the art will appreciate that user interfaces, such as user interface 500 may include various arrangements depending on various factors, including user preferences, device hardware, design considerations, or the like. Likewise, one of ordinary skill in the art will appreciate that user interfaces may include more or fewer panels, user interface controls, labels, or other user interface features without departing from the scope of these innovations. However, for brevity or clarity user interface 500 is a simplified representation of a creator portal that a user may employ to create artwork.

In this example, panel 502 may be considered a user interface area that contains one or more other panels.

In some embodiments, such panels may include panels for listing or selecting digital graphic tools, such as tool panel 504. In some embodiments, tool panels may be considered to be user interfaces that list or otherwise enable access or selection of digital tools for modifying an artwork. In some embodiments, this may include a selection of digital pens, brushes, erasers, color selectors, or the like. Likewise, in some embodiments, tools may include enable the selection or AI prompts, or the like. In some embodiments, media creativity platforms may be arranged to determine which tools to display based on rules, preferences, instructions, or the like, provided via configuration information to account for local circumstances or local requirements. In this example, for some embodiments, users may be assumed to be enabled to select a tool using a pointing device, such as a mouse, trackball, graphic tablet stylus, or the like.

In this example, status panel 506 may represent a user interface for display a creativity score, such as creativity score 510A which may represent a running count of the current creativity score for an artwork. In some embodiments, in addition to a value, creativity scores may be displayed or emphasized using styling features (e.g., colors, font, or the like) that may provide a visual indication of the level of human creativity in the current artwork. Note, in some embodiments, status panels may include other information, such as a work timer, undo/redo controls, artwork specifications (e.g., size, pixel count, or the like), controls for include annotations or notes, or the like.

In this example, for some embodiments, artwork panel 508 may be considered a panel that displays the current state of the artwork of interest. In some embodiments, artwork panel user interfaces may enable users to interact in various ways with the artwork. One of ordinary skill in the art will appreciate that in production applications, artwork panels may include (or be associated with) various features/controls, including, zoom, rotate, scroll, area selection boxes, copy and paste, or the like, that for brevity and clarity are omitted from this example.

Accordingly, in some embodiments, artwork 512A may be displayed in artwork panel 508. In this example, for some embodiments, artwork 512A may be considered to be generated by a generative artificial intelligence system based on one or more prompts. For example, for some embodiments, artwork 512A may be considered to be generated using a prompt such as "draw a simple abstract face that is similar to a jack-o-lantern." Note, artwork 512A is provided here as an example to illuminate the features of these innovations. One of ordinary skill in the art will appreciate that the scope of the innovations is not limited by this artwork example. Accordingly, in some embodiments, the subject, detail, or appearance of media creativity platform artwork may be considered to be arbitrary depending on the initial prompts, the employed generative artificial intelligence, user preferences, or the like. Also, in some embodiments, media creativity platforms may be arranged to enable users to import an initial artwork from other sources or other generative artificial intelligence systems. Further, in some embodiments, the initial artwork may be comprised of one or more portions or pieces that may be combined together to produce artwork 512A. Further, while artwork 512A may be referred to as an initial artwork, it may also represent an artwork in an intermediate condition such as a work in progress.

Further, in this example, creativity score 510A may indicate a low value because few if any creative actions have been applied to artwork 512A.

FIG. 5B illustrates a logical representation of user interface 500 for quantifying and validating human creative input in AI-generated content in accordance with one or more of the various embodiments. However, in this example, for some embodiments, artwork 512B reflects several creative actions that executed by a human user on the original AI generated artwork.

In this example, for some embodiments, modification 514, modification 516, modification 518, modification 520, modification 522, or the like, may be considered to represent creative actions that were performed by a human user. For example, a user may use select a tool from tool panel 504 and employ it to manually modify artwork 512B. For example, in some embodiments, a user may employ a pen tool to manually shade or otherwise modify artwork 512B to include modification 520. Note, in some embodiments, each modification may represent changes in color, patterns, de novo manual illustrations, or the like, that a user may have performed to artwork 512B using one or more tools selected from a tool panel such as tool panel 504.

Accordingly, in some embodiments, media creativity platforms may be arranged to track each creative action associated with modifications 518-522. In some embodiments, such tracking may include collecting one or more metrics or attributes associated with the one or more creative actions. Note, in some embodiments, two or more creative actions may be associated with a modification. For example, in some embodiments, a modification, such as modification 518 may be the result of several creative actions, such as, selecting or employing one or more pens/brushes, selecting or employing one or more colors/patterns, or the like. Also, in some embodiments, tracking creative actions may include tracking the process of trial and error employed by users to arrive at a final modification. For example, in some embodiments, if a user tries two or more tools or colors before settling on a final modification, the intermediate/candidate actions may be tracked as creative actions because they represent creative decisions made by a human author. Likewise, in some embodiments, associated actions, activities, or inactivity, such as dwell time between strokes, tool selection, or the like, may be tracked as well. Thus, in some embodiments, each tracked activity (e.g., creative action) may be evaluated to determine its contribution to the overall creativity score for the artwork.

In some embodiments, media creativity platforms may be arranged to track other metrics, such as a running count of creative actions, percentage or portion of the artwork that is touched, modified, or covered by effects of creative actions, or the like.

In some embodiments, media creativity platforms may be arranged to enable one or more creative actions to be grouped into groups or layers. Accordingly, in some embodiments, the grouping itself (selecting which creative actions or modifications should be included in a group or layer) may be considered creative actions.

In this example, for some embodiments, creativity score 510B is shown to be higher than creativity score 510A because of the creative actions applied to artwork 512B as compared to artwork 512A

Further, in some embodiments, media creativity platforms may be arranged to include creativity reports in creativity report panels, such as report panel 524. In some embodiments, report panels may be considered user interfaces that enable continuous, or on-demand updates associated with creative action records, partial creativity scores associated with creative actions, inferences or predictions of the level of human creativity included in the artwork.

In some embodiments, media creativity platforms may be arranged to provide one or more user interfaces such as user interface 500. In some embodiments, user interfaces may include various windows, controls, or other user interface features. In some embodiments, user interfaces may include various user interface panels, such as panel, or the like. For example, in some embodiments, panel 506 may represent a user interface that enables users to review one or more creativity scores associated with creative action records. Further, in some embodiments, panel 506 or panel 524 may include user interface controls that enable a user grade, validate, confirm, or reject predicted/displayed creativity information. For example, in some embodiments, panel 524 may include controls such as check boxes, selection lists, fields for collecting feedback, buttons to display another user interface for providing additional feedback, or the like.

In some embodiments, media creativity platforms may be arranged to generate or display user interface 500 to users using one or more of video interface 242, projector 246, display 250, or the like, of a client computer, such as client computer 200. Also, in some embodiments, media creativity platforms may be arranged to generate or display user interface 500 to users using a one or more of input/output interface 338, display 350, audio interface 356, or the like, of a network computer, such as network computer 300.

In some embodiments, panel 524 may be arranged to display a rank ordered list of creative action records with associated partial creativity scores based on the various metrics, such as confidence scores, or the like. Likewise, in some embodiments, ordering, grouping, emphasis styling, or the like may be based on tool types, creative action type, creativity scores, or the like, associated with the reported creative action records. Note, in some embodiments, one of ordinary skill in the art will appreciate that organizations may have significant control or influence over the particular ranking criteria or display design. For example, in some cases, one or more creative actions or creative action types may be considered more important than others. Accordingly, in some embodiments, some creative action records may be associated with different positioning or styling depending on the particular creative actions associated with the creative action records.

In some embodiments, for example, media creativity platforms, one or more client applications, or the like, may be arranged to generate one or more user interfaces that may dynamically be arranged to display one or more creativity scores, creative action records, or creative action journals that may be associated with an artwork.

In some embodiments, media creativity platforms may be enabled to provide results associated with particular types or categories of creative actions. In some embodiments, media creativity platforms may be arranged to collect various telemetry or other metrics associated with user interactions with user interfaces. In some embodiments, telemetry may include tracking if users may be in agreement with the information included in creativity reports. For example, if users commonly interact with creative action records associated with particular creative action types, it may indicate that the metrics employed for displaying creative action records in panel 524 may be deficient.

In one or more of the various embodiments, media creativity platforms may be arranged to monitor telemetry information associated with one or more users of user interface 500.

Accordingly, in some embodiments, media creativity platforms may be arranged to provide one or more facilities to collect direct feedback from one or more users that may interact with one or more records or information displayed in report panel 524. For example, in some embodiments, user interfaces may include controls that enable authorized users to grade report content, creativity scores, or other display features. Likewise, in some embodiments, a user interface may be provided to grade reports as a whole.

In some embodiments, grades or scores associated with user interface features or the information display in the user interfaces may be binary (e.g., like/dislike), discrete (e.g., one-four stars, letter grades), continuous values, or the like.

In some embodiments, telemetry information employed to monitor user preferences may be based on monitoring user interactions as well as direct feedback. Accordingly, in some embodiments, information (e.g., creative action records, creativity scores, or the like) that may be displayed but are ignored or discarded by users may be inferred to be poorly received. For example, for some embodiments, if the some creative action records or reports determined by the media creativity platforms, or the like, are ignored or lower ranked creative action records or reports draw more interaction by users, it may be inferred that there may be a problem with the determination or scores of creative action records or creative action journals for the current application.

Further, in some embodiments, media creativity platforms may be arranged to receive telemetry information from other services or applications. Accordingly, in one or more of the various embodiments, media creativity platforms are not required to directly monitor activity associated with the creativity reports, or the like. For example, for some embodiments, user interfaces may be displayed to users via desktop computer applications, mobile applications, web-based applications, or the like. In some embodiments, such applications may commonly collect telemetry information and provide some or all of it to media creativity platforms rather than requiring the media creativity platforms to include monitoring facilities on user-side application.

Accordingly, in some embodiments, media creativity platforms may be arranged to collect metrics or telemetry associated with user interactions with user interface 500 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Also, in some embodiments, detection engine 1302 may be arranged to collect metrics or telemetry associated with user interactions with user interface 1304 using a one or more of input/output interface 338, GPS 340, keyboard 352, audio interface 356, pointing device interface 358, or the like, of a network computer, such as network computer 300.

In some embodiments, media creativity platforms may be arranged to track mouse movement, eye movement, keystrokes, or the like, to determine how users may interact with information (e.g., events, event report, recommended responses, resources, actions, or the like) displayed in user interfaces. Accordingly, in some embodiments, media creativity platforms may be arranged to evaluate at least the quality of various report results, recommendations, or reports based on how users interface with them. For example, if users consistently select or otherwise favor particular types of information or types of reports more than others, it may indicate that one or more processes performing the report generation or creativity scoring matching may be experiencing diminished or diminishing effectiveness. Likewise, it may indicate that one or more creativity models may need retraining or reevaluation. In some embodiments, media creativity platforms may be arranged to associate a performance score with various creativity determination (e.g., creativity scoring) based on the user interaction metrics or telemetry. Accordingly, in some embodiments, if the performance score associated with creativity determinations falls below a defined threshold value, creativity models may be arranged to suspend those particular one or more associated creativity models or creativity scoring processes from operation.

Also, in some embodiments, media creativity platforms may be arranged to arrange, re-arrange or adapt user interfaces based on user telemetry or metrics associated with one or more user interactions with media creativity platform server computers display content within the user interfaces. In some embodiments, user profiles may be configured to include user interface preferences based on collected metrics and user feedback. Accordingly, in some embodiments, media creativity platforms may be arranged to select, position, size, highlight, or style one or more user interface components based on one or more of user interaction metrics and user feedback. For example, if users are tracked focusing on or navigating to particular user interface views, components, or user interface panels, media creativity platforms may be arranged to highlight or size the preferred user interface elements or user interface panels. For example, if users are determined to rarely interact with a display panel such as display panel 524, detection engines may be arranged to reduce the size and change the position of display panel 524 by displaying a smaller sized version, increasing or decreasing the amount of information shown in the panel, or the like.

Also, in some embodiments, media creativity platforms may be arranged to adapt user interfaces based on the size/type of display, input methods, user status, or the like. For example, in some embodiments, if a user is determined to be operating using a mobile device, one or more user interface elements may be positioned differently. In some cases, for some embodiments, depending on the display type or display size, one or more user interface elements may be hidden from view. Accordingly, in some embodiments, media creativity platforms may be arranged to tangibly modify user interfaces, interactive reports, input collection, input selection, creativity reports, creative action records, creativity scores, or the like, based on the efficient and effective performance of processes and/or activities associated with various types of creative action tracking or evaluation.

Figure 6:
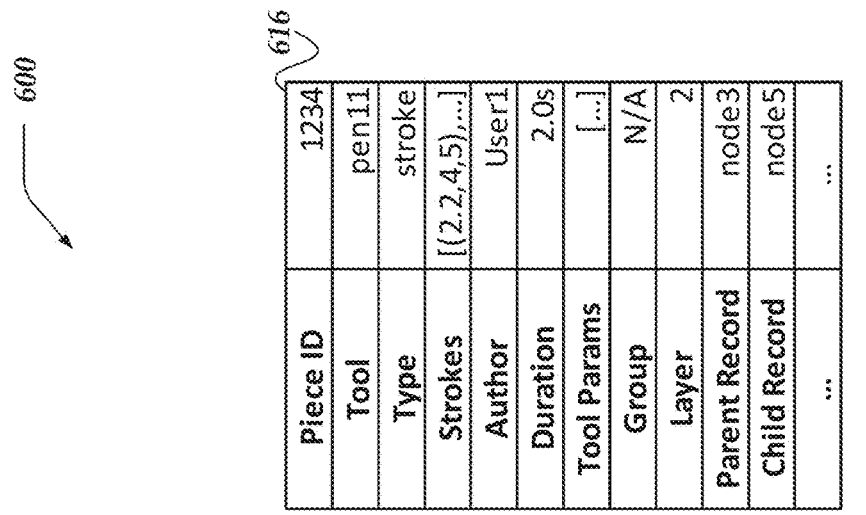
FIG. 6 illustrates a logical schematic of a creative action journal for quantifying and validating human creative input in AI-generated content in accordance with one or more of the various embodiments.

FIG. 6 illustrates a logical schematic of creative action journal 600 for quantifying and validating human creative input in AI-generated content in accordance with one or more of the various embodiments.

As described above, in some embodiments, media creativity platforms may generate creative action journals that record the creative actions that may have been applied to an artwork by a human author. Accordingly, in some embodiments, creative action journals may be data structures that store or represent the information associated with each creative action that may be performed. In some embodiments, media creativity platforms may be arranged to generate creative action records that represent creative actions. In some embodiments, media creativity platforms may be arranged to include creative action records in creative action journals.

In some embodiments, one or more creative action journals may be associated with artworks, or portions of artworks. In some embodiments, in some cases, creative action records may be associated with particular portions, objects, or layers that may comprise an artwork. Also, in some embodiments, creative action records may be associated or linked with one or more other creative action records based on the various factors, including order of operations, tool selection, portion of the artwork. In some embodiments, creative action journals may be comprised of creative action records that may be arranged as trees, graphs, linked lists, or the like. In some cases, in some embodiments, one or more creative action records may be considered sub-actions or child-actions of other creative action records that may be inferred to have a greater scope that its sub-actions or child-action.

In some embodiments, media creativity platforms may be arranged to apply one or more rules or conditions for determining the scope of a given creative action record. For example, in some embodiments, media creativity platforms may be configured to create a new creative action records each time a different tool is selected with each use of the tool being treated as a sub-action or a detail metric within a single creative action record. In other cases, for some embodiments, media creativity platforms may be configured to track each tool movement or use as a separate creative action record.

In this example, for some embodiments, root node 602 represents a beginning of a chain of creative action records. In some embodiments, root node 602 may be the beginning of a chain of creative action records that may be initialized based on one or more chain initializing conditions, such as a selection of new tool, interaction with a new/different object/portion in the artwork, starting a new project, including a new artwork, or the like.

In some embodiments, creative action record nodes, such as node 604 through node 614 may represent individual creative action records each associated with one or more creative actions. In some embodiments, media creativity platforms may be configured to group or collect one or more creative actions into single creative action records. In some embodiments, media creativity platforms may be arranged to close a first creative action record and open a next creative action record based on one or more rules or conditions which may include, dwell/wait time between actions, changing tools, introducing new artwork objects or artwork portions into the artwork, adding additional artwork pieces into a project, manually triggering (e.g., user manually initiates a new creative action record), performing actions on different objects/layers in the artwork, or the like.

In some embodiments, media creativity platforms may be arranged to generate creative action journals that associate creative action records with an artwork. In some embodiments, creative action journals may be considered graphs or trees where the nodes represent creative action records, and the edges represent transitions from on creative action record to another.

In some embodiments, creative action records may include information, such as tool type, tool details (e.g., pen width, pen shape, or the like), color, fill type, duration of action, location/geometry information relating to where in the artwork the creative action occurred, length of stroke, curve or spline information, or the like. Also, in some embodiments, creative action records may include information identifying the user that executes a creative action, project identifiers, or the like.

In some embodiments, media creativity platforms may be arranged to generate creative action records that enable the associated actions to be replayed to regenerate the changes to the artwork. Likewise, in some embodiments, media creativity platforms may be arranged to enable creative action records to be replayed in reverse to undo one or more creative actions executed on the artwork.

In some embodiments, media creativity platforms may be arranged to generate snapshots of the artwork at each creative action record. Accordingly, in some embodiments, creative action journals may include definitive representations of how the appearance of the artwork may have changed for each creative action record. Note, in some embodiments, some creative action records may be associated with creative actions that may not modify the appearance of the artwork. For example, in some embodiments, as mentioned above, if a user selects a first tool but then selects a second tool before using the first tool, media creativity platforms may record the selection of the first tool as a creative action even though the first tool was not used. Accordingly, in this example, the creative action represents the human creativity used for selecting among the available tools, including selecting tools that may be discarded before being used in the artwork.

In this example, for some embodiments, node 604 may represent a creative action record, such as selecting a tool, node 606 may represent a creative action record associated with one or more uses of the tool, node 608 may represent a creative action record associated with the selection of another tool, or the like.

In this example, for some embodiments, node 610 may represent a creative action record associated with a different portion of the artwork, while node 612 or node 614 may represent creative action records associated with that portion of the artwork, or the like.

Accordingly, in this example, creative action journal 600 may be represented using graph or tree-like data structures to represent the entirety of creative actions that may be associated with an artwork.

In some embodiments, edges that connect or transition between creative action record nodes may be associated with one or more metrics or attributes, including dwell time, geometric distance (in the artwork) between two creative actions, user/author transitions, or the like.

In some embodiments, as described above, media creativity platforms may be arranged to assign creativity scores with particular creative actions or metrics associated with creative actions. Accordingly, in some embodiments, nodes in creative action journals may be associated with creativity scores that represent an accumulated score for each creative action that may be associated with a creative action record. Further, in some embodiments, in some cases, some or all transitional actions represented by edges may be associated with creativity scores or creativity score multipliers.

Accordingly, in some embodiments, media creativity platform may be arranged to traverse the creative action journal tree to determine a creative action score for the artworks associated with a given creative action journal tree. In some embodiments, media creativity platforms may be arranged to normalize creative action scores to improve human readability or comprehension. For example, in some embodiments, media creativity platforms may be configured to normalize raw creativity scores to a range of values, such as 0 to 100, or the like. Also, in some embodiments, media creativity platforms may be configured to map raw creative actions to discrete categories representing different levels of creativity, such as low, medium, high, or the like. Also, in some embodiments, media creativity platforms may be configured to provide a binary result, such as red/green, or the like, based on the raw creativity scores such that the values indicate an inference that the creative modifications to the artwork exceed a threshold value.

In this example, table 616 may be considered to represent information that may be included in a creative action record. In some embodiments, the number of fields, columns, or attributes used for representing creative action records may vary depending on various factors, including type of tool, type of artwork (e.g., graphic, audio, video, or the like), user/organization preferences, or the like. Note, one of ordinary skill in the art will appreciate that the field labels/descriptions for creative action record data structures may vary without departing from the scope of these innovations. Accordingly, in some embodiments, media creativity platforms may be arranged to be adaptable to the introduction of new or additional tools, tool types, artwork types, or the like. Thus, in some embodiments, media creativity platforms may be arranged to employ rules, instructions, libraries, or the like provided via configuration information to account for local circumstances or local requirements. Further, for brevity or clarity individual descriptions of the fields in table 616 are omitted because their purpose and meaning will be evident to one of ordinary skill in the art.

Also, in some embodiments, creative action records may include information, such as including prompts (or references thereto) that may have been used to generate one or more portions of the artwork from an AI. Also, in some embodiments, creative action records may include or reference screenshots, snapshots, or the like, of the artwork before or after the creative actions associated with the creative action record were executed.

Also, in some embodiments, while not shown, meta-data associated with the artwork as a whole may be collected and stored within the project or with the creative action journal. In some embodiments, while the particular fields may vary depending on how media creativity platforms are configured, they may include project/artwork owner, creation date, completion date, location position (e.g., file system path, URI, URL, or the like), associated AI prompts, version, serial numbers, or the like.

Figure 7:
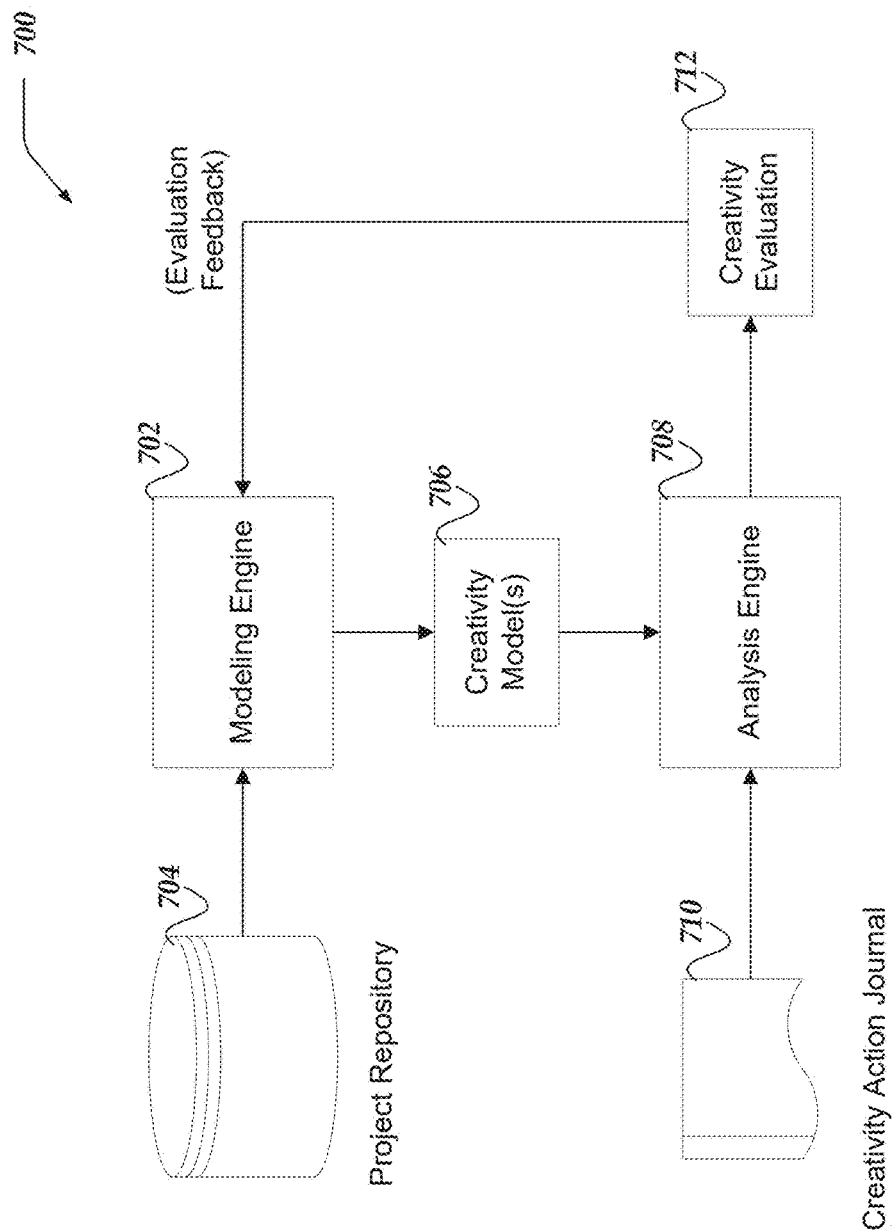
FIG. 7 illustrates a logical schematic of a system for quantifying and validating human creative input in AI-generated content in accordance with one or more of the various embodiments.

FIG. 7 illustrates a logical schematic of system 700 for quantifying and validating human creative input in AI-generated content in accordance with one or more of the various embodiments.

In some embodiments, media creativity platforms may be arranged to include one or more modeling engines that may be employed to generate creativity models. In some embodiments, media creativity platforms may be arranged to employ creativity models to evaluate if the creative action journals associated with projects may indicate or infer that the artworks in the projects may be considered to be the result of human creativity as opposed to being considered machine generated.

Accordingly, in some embodiments, modeling engines, such as modeling engine 702 may be provided a repository of creative action journals for past projects or synthetically generated creative action journals. Accordingly, in some embodiments, modeling engine 702 may be arranged to train or otherwise generate one or more creativity models, such as creativity models 706 based on the creative action journals included in project repository 704.

In some embodiments, creativity models may be trained to infer if the artworks associated with a given creative action journal may be designated as human created. Also, in some embodiments, creativity models may be trained using creative action journals associated with artwork known to be considered human created based on one or more criteria. For example, creative action journals for artwork that have previously qualified as being determined to be human created may be used to train creativity models that may then be used to evaluate the creativity of other artworks based on their associated creative action journals.

In some embodiments, creativity models may be trained such that the creativity scores associated with artworks may be correlated with the inferences of human creativity. Accordingly, in some embodiments, while detailed creative action journals may be employed to compare artworks with creativity models, the associated creativity scores may provide a human readable indication of the level of similarity to other artworks that were recognized or validated as being created by humans. Also, in some embodiments, creativity scores may be interpreted as a likelihood or probability that the associated artworks may be determined to be human created.

Accordingly, in some embodiments, analysis engines, such as analysis engine 708 may be arranged to employ creativity models 706 to evaluate artworks or projects based on creative action journals, such as creative action journal 710. In some embodiments, analysis engines may be arranged to generate a creativity evaluation report, such as creativity evaluation report 712 that may be displayed or presented in a user interface.

In some embodiments, media creativity platforms may be arranged to collect passive or direct feedback associated with quality of the creativity evaluations. For example, in some embodiments, media creativity platforms may be arranged to provide one or more user interfaces that enable users to submit feedback in various forms, such as discrete grades/scores, narrative feedback, or the like. Also, in some embodiments, media creativity platforms may be arranged to passively monitor interactions with the creativity report or the associated artworks to evaluate the quality or accuracy the creativity evaluation. For example, in some embodiments, media creativity platforms may be arranged to monitor if additional creative actions may be performed subsequent to an initial evaluation. Thus, for example, media creativity platforms may be arranged to infer that the evaluation was poorly received if the user continues to add creative actions to the previous evaluate artwork.

In some embodiments, media creativity platforms may be arranged to evaluate the feedback associated with the creativity models to determine if a given creativity model may be deficient. Accordingly, in some embodiments, deficient models may be designated for retraining or disposal.

Also, in some embodiments, media creativity platforms may be arranged to periodically generate updated creativity models as the projects in project repositories may change. For example, projects once considered human created under an older criterion may later fail current criteria. Thus, for example, modeling engines may be arranged to generate updated creativity models based on updated criteria or updated projects.

Generalized Operations

FIGS. 8-13 represent generalized operations for quantifying and validating human creative input in AI-generated content in accordance with one or more of the various embodiments. In one or more of the various embodiments, processes 800, 900, 1000, 1100, 1200, and 1300 described in conjunction with FIGS. 8-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 8-13 may be used for quantifying and validating human creative input in AI-generated content in accordance with at least one of the various embodiments or architectures such as those described in conjunction with FIGS. 1-7. Further, in one or more of the various embodiments, some or all of the actions performed by processes 800, 900, 1000, 1100, 1200, and 1300 may be executed in part by tracking engine 322, analysis engine 324, modeling engine 326, or the like, running on one or more processors of one or more network computers.

Figure 8:
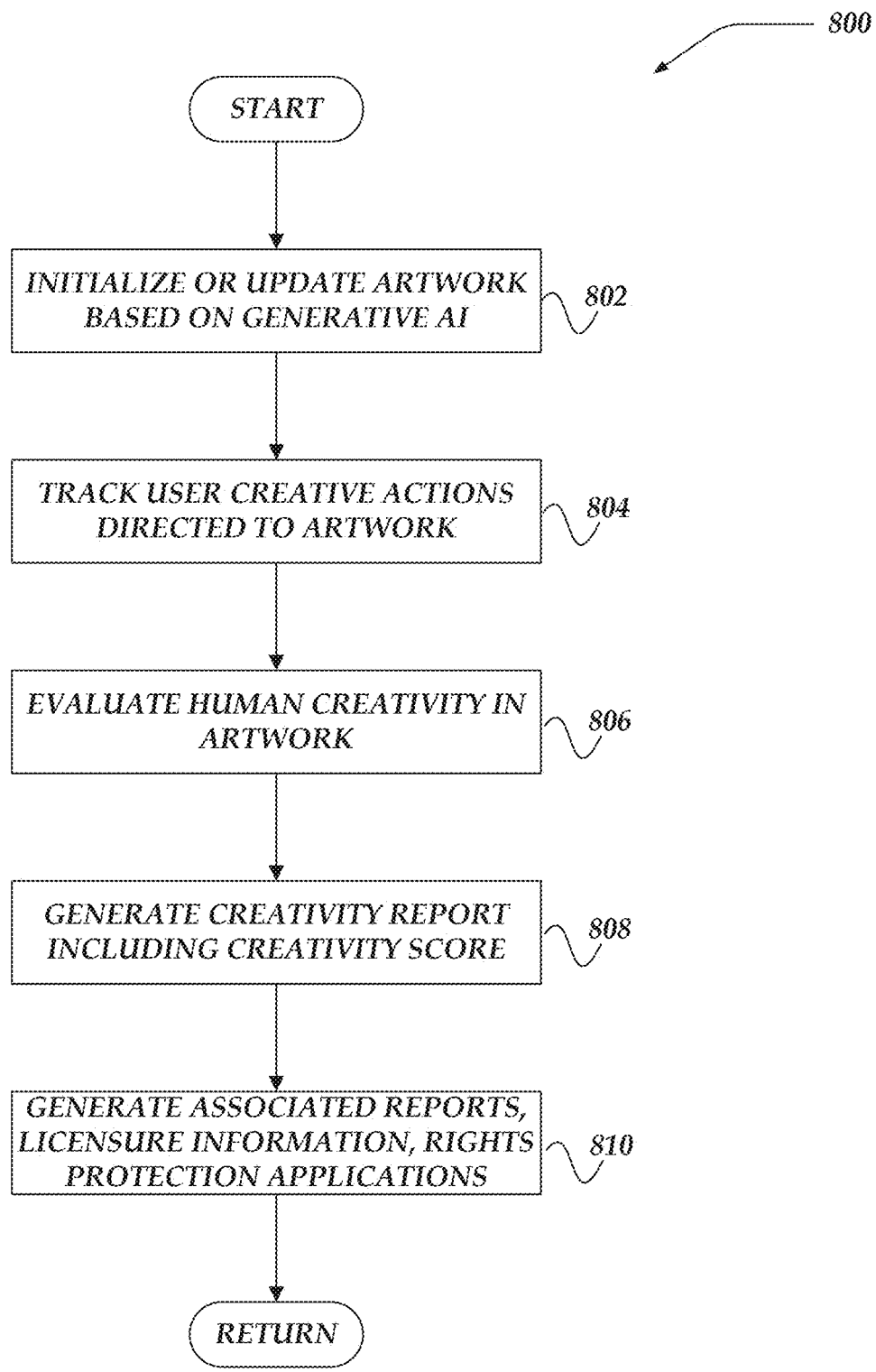
FIG. 8 illustrates an overview flowchart of a process for quantifying and validating human creative input in AI-generated content in accordance with one or more of the various embodiments.

FIG. 8 illustrates an overview flowchart of process 800 for quantifying and validating human creative input in AI-generated content in accordance with one or more of the various embodiments. After a start block, at block 802, in one or more of the various embodiments, media creativity platforms may be arranged to initialize or update artwork based on generative artificial intelligence, or the like. As described above, in some embodiments, media creativity platforms may be arranged to provide user interfaces that enable users to employ generative artificial intelligence, or other AI, to generate artworks. In some embodiments, media creativity platforms may be arranged to enable users to select from pre-made prompts or prompt templates such that the user interface collects brief statements that may be included in the prompts before submission to AIs. Also, in some embodiments, media creativity platforms may be arranged to enable users to upload complete prompts rather than being restricted to templates or pre-made prompts.

Note, one of ordinary skill in the art will appreciate that prompts as used here refer to input information, usually text, that may be submitted to generative artificial intelligence systems which in turn interpret the prompts and generate content based on the prompts.

In some embodiments, media creativity platforms may be arranged to be adaptable to employing different types or versions of AI systems. Likewise, media creativity platforms may be arranged to be adaptable to changes in prompting strategies or prompt engineering that may be determined by experiment or observation. Accordingly, in some embodiments, media creativity platforms may be arranged to employ instructions, rules, libraries, plug-ins, or the like, provided via configuration information to accommodate different types of prompting or AI systems to account for local requirements or local circumstances.

In some embodiments, media creativity platforms may be arranged to provide user interfaces that enable users to upload artwork generated elsewhere. Also, in some embodiments, artwork is not limited to graphics or illustrations. While those types of artwork are used in most of the examples herein, the innovations anticipate being applied to other type of media, such as video, music, audio, or the like.

At block 804, in one or more of the various embodiments, media creativity platforms may be arranged to track creative actions directed to the artwork.

In some embodiments, creative actions may be considered to be humane initiated activity that may be directed to creating a human created work from the initial artwork.

In some embodiments, creative actions may include tool selection, tool activity, dwell time, or the like, that may provide evidence of the human creative process. For example, for some embodiments, if a user selects a tool for modifying the artwork, the act of the selection itself may be considered to be a creative action. Likewise, for example, executing strokes, or the like using selected tools may be considered different creative actions. Further, in some embodiments, the time it takes between tool selection or tool execution may be tracked as creative actions or associated with creative actions because the delay between actions may be considered evidence of the human creative process (e.g., creative thinking between actions). Also, in some embodiments, selecting a tool and then abandoning that selection may be considered a creative action.

Likewise, as discussed above, for some embodiments, media creativity platforms may be arranged to track interactions with the user interface including mouse movement, graphic tablet interaction, or the like, associated with pointing devices supported by the hosting workstations or the media creativity platforms.

Further, in some embodiments, if the media creativity platforms user interfaces may be configured to support eye tracking, eye movements may be considered creative actions.

Also, in some embodiments, media creativity platforms may be arranged to provide user interface that enable users to provide notes or natural language narratives that may be used to annotate one or more of the artwork, portions of the artwork, object or layers in the artwork, creative actions, or the like. In some embodiments, such notes may be included in creativity report to provide additional evidence of the human creative processes that are used on the artwork.

At block 806, in one or more of the various embodiments, media creativity platforms may be arranged to evaluate the amount of human creativity in the artwork. In some embodiments, media creativity platforms may be arranged to gather creative actions into creative action records that may be used to generate creative action journals for the artworks.

In some embodiments, creative actions included in the creative action journal may be associated with partial creativity scores that may be used to predict or infer the amount human creativity that may be associated with an artwork.

In some embodiments, one or more creative actions may be associated with different creativity values or weights than other creative actions.

In some embodiments, media creativity platforms may be arranged to compare the creative action journal of an artwork with other artwork that may be included in a project repository. Accordingly, in some embodiments, media creativity platforms may be arranged to compare the creative action journal of projects that include artwork that has been previously determined to be human created with the current artwork. Accordingly, in some embodiments, similarity or dissimilarity of the creative action journals, creativity scores, or the like may be employed to predict or infer if the current artwork may be considered to be human created.

In some embodiments, media creativity platforms may be arranged to employ one or more creativity models to predict or infer if the creative action journal of an artwork may indicate if the artwork may be considered to be human created.

Note, the standards for predicting or inferring if an artwork may be human created may be determined based on various sources. For example, in some embodiments, an independent committee or group of human evaluators may establish standards that media creativity platforms may incorporate. Also, in some embodiments, regulatory bodies, such as copyright departments/agencies, commissions, courts, accreditation boards, or the like, may establish guidelines or criteria regarding if artwork may be considered to be human created as opposed to machine created. For example, in some embodiments, if an artwork has been designated by a regulatory body to be eligible for copyright protection, that artwork may be used as an example for determining creativity score thresholds, training creativity models, or the like. Further, in some embodiments, if artwork determined to be human created may be associated with a creative action journal, the creative action journals of those artworks may be employed to train creativity models, establish creativity scores threshold, or the like.

Further, in some embodiments, media creativity platforms may be arranged to be adaptable to changing standards, availability of evidence, types of evidences, or the like for predicting or inferring if an artwork may be considered human created. Accordingly, in some embodiments, media creativity platforms may be arranged to employ rules, instructions, libraries, plug-ins, or the like for determining the particular criteria or standards for predicting or inferring human creativity via configuration information to account for local requirements or local circumstances.

At block 808, in one or more of the various embodiments, media creativity platforms may be arranged to generate creativity reports including creativity scores for the artwork.

In some embodiments, media creativity platforms may be arranged to generate creativity reports that indicate the current prediction or inference regarding the level of human creativity associated with the current artwork. In some embodiments, media creativity platforms may be arranged to update the reports or scores as users execute creative actions. Accordingly, in some embodiments, an initial report may indicate zero or limited human creativity, as the user proceeds to execute creative actions, media creativity platforms may update the creativity reports or creativity scores.

In some embodiments, media creativity platforms may provide user interfaces that display a representation of the predicted or inferred human creativity level for an artwork as the user executes creative actions. See, status panel 506 discussed with FIG. 5A or 5B.

In some embodiments, user interfaces for status reports may be configured to enable users to drill down into creative action records, creative action journals, or the like, associated with the artwork being worked on.

At block 810, in one or more of the various embodiments, media creativity platforms may be arranged to generate one or more associated reports, licensure information, copyright applications, referrals, or the like.

In some embodiments, media creativity platforms may be arranged to generate reports that may be employed to provide evidence or proof of the creative actions that occurred to generate the finished artwork. In some embodiments, such reports may include creative action summaries, such as, the amount of time the user worked on the artwork, the number of tools users, percentage of original artwork that has modified or added by creative actions, or the like.

Also, in some embodiments, media creativity platforms may be configured to generate forms for applications for copyright protection, contracts, licenses, or the like. In some embodiments, media creativity platforms may be arranged to provide a configurable document or report generated that enable users configured various forms that may be generate the media creativity platform for the artwork or project. For example, in some embodiments, media creativity platforms may be arranged to generate reports that may be directed to providing evidence of the human creativity that was employed to generate the artwork based on the creative actions used in the creation of the final version of artwork.

Next, in one or more of the various embodiments, control may be returned to a calling process.

Figure 9:
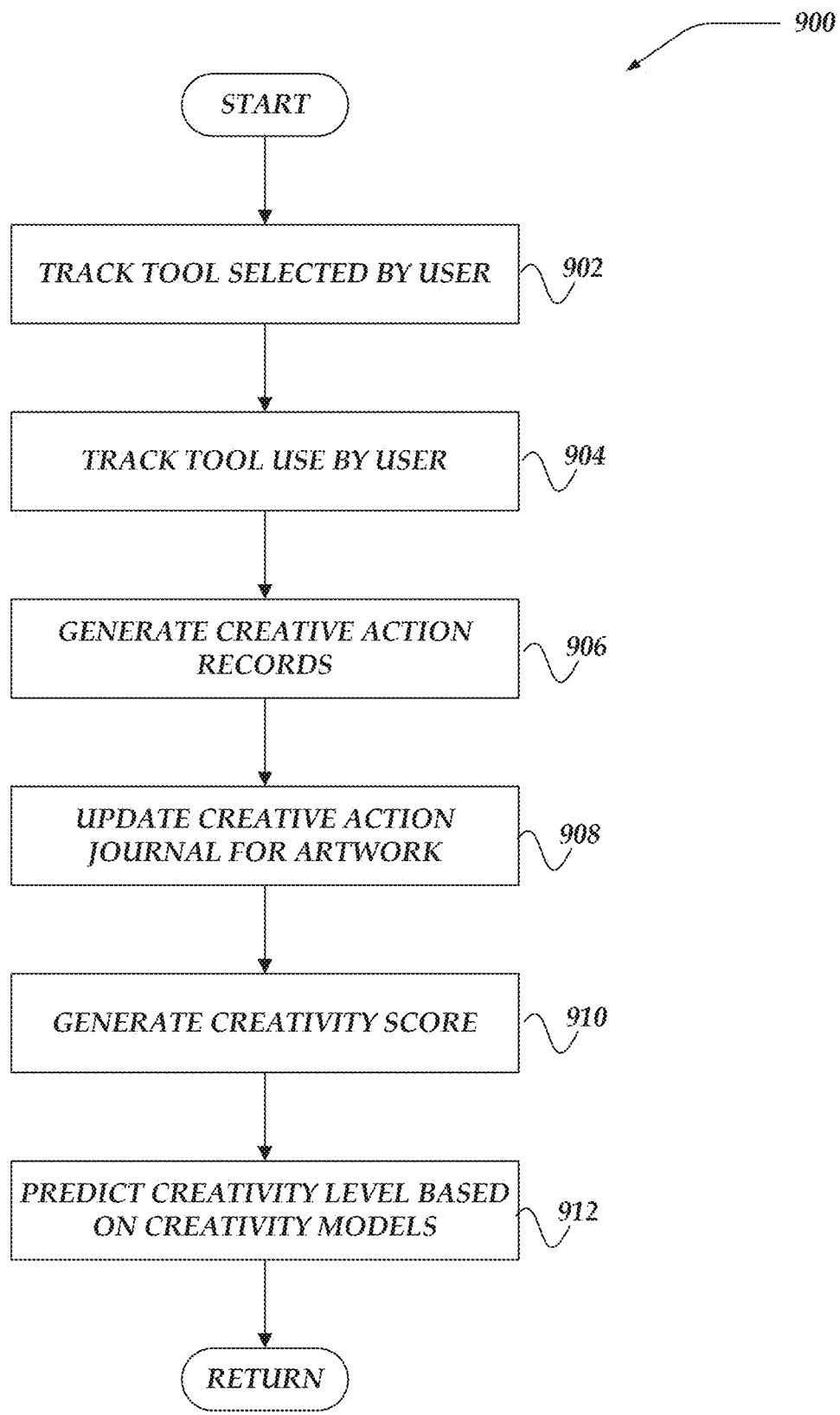
FIG. 9 illustrates a flowchart of a process for quantifying and validating human creative input in AI-generated content in accordance with one or more of the various embodiments.

FIG. 9 illustrates a flowchart of process 900 for quantifying and validating human creative input in AI-generated content in accordance with one or more of the various embodiments. After a start block, at block 902, in one or more of the various embodiments, media creativity platforms may be arranged to track tools that may be selected by a user. As described above, in some embodiments, media creativity platforms may be arranged to provide user interfaces that may include display panels or user interface controls that enable one or more digital tools to be selected by a user. For example, if the artwork may be a graphic or illustration, media creativity platform tool panels may offer tools, such as pens, brushes, color pickers, color palettes, erasers, smudgers, pattern stamps, selection boxes, line drawing tools, fill tools, spray tools, pencils, or the like. Note, the availability of particular tools may vary depending on various factors, such as user preferences, product versions/licensing, or the like. Accordingly, in some embodiments, media creativity platforms may be arranged to determine the availability of tools based on rules, instructions, plug-ins, or the like that may be determined from configuration information.

At block 904, in one or more of the various embodiments, media creativity platforms may be arranged to track the use of the tools.

In some embodiments, tool use may include various actions associated with a tool, such as executing tool strokes/actions, undoing actions, redoing actions, selecting or deselecting tools, or the like. Accordingly, in some embodiments, tool use may include activity that may not alter the appearance of the artwork. For example, executing a tool stroke followed by an undo operation followed by a redo operation may be considered three tool uses actions or creative actions.

Likewise, in some embodiments, the dwell time or wait time between tool use actions may be considered creative actions because they may be indicative of the decision making process that may be part of the human creative process.

In some embodiments, each tracked use, operation, wait time, tool selection, tool deselection, or the like, may be referred to a creative action.

Further, in some embodiments, media creativity platforms may be arranged to compare one or more metrics associated with creative actions associated with contemporaneous executions of a tool with other creative actions associated with past executions of the same tool. Accordingly, in some embodiments, media creativity platforms may be arranged to determine one or more anomalous creative actions based on the comparison. Accordingly, in some embodiments, media creativity platform may be configured to increase the (partial) creativity scores associated with the one or more anomalous creative actions because the uniqueness of the operations may be considered to indicate human creativity.

At block 906, in one or more of the various embodiments, media creativity platforms may be arranged to generate one or more creative action records. In some embodiments, media creativity platforms may be arranged to generate creative action records for each creative action.

In some embodiments, creative action records may be considered to the be data structures used for representing creative actions. Accordingly, in some embodiments, creative action records may include information for identifying the corresponding creative action or creative actions. In some embodiments, creative action records may include information about the details of the associated tools, artwork portions (e.g., objects, layers, or the like), details of the actions/strokes performed by the tool, other context information, or the like.

In some embodiments, creative action records may include or reference snapshots or other records that may represent the before or after state of the artwork. For example, in some embodiments, media creativity platforms may be arranged to capture a screenshot of a graphic artwork before or after the creative actions in the creative action record were executed. In some embodiments, media creativity platforms may be arranged to omit the artwork snapshot for creative action records associated with actions that do not change the appearance of the artwork.

In some embodiments, media creativity platforms may be configured to group two or more creative actions into a single creative action record. For example, in some embodiments, media creativity platforms may be configured to generate creative action records that include one or more creative actions associated with tool stroke which may include tool selection, dwell time, or the like rolled up into a single creative action record. Note, in some embodiments, such included creative actions may remain distinguishable within the creative action record even though they are not included in separate creative action records. However, one of ordinary skill in the art may assume that each creative action is included in a creative action record.

At block 908, in one or more of the various embodiments, media creativity platforms may be arranged to update the creative action journal for the artwork. As described above, in some embodiments, media creativity platforms may employ the creative action records to generate creative action journals for projects or artwork. In some embodiments, creative action journals may be data structures that represent the collection of creative action record that may be associated with an artwork or project.

Thus, in some embodiments, media creativity platforms may be arranged to update creative action journals to include creative action records as they may be generated.

In some embodiments, media creativity platforms may be arranged to generate creative action journals that may subsequently be compared or analyzed. For example, in some embodiments, creative action records may include links or references to related creative action records such that the journal of the human creative process that generated the artwork may be completely reviewed. In some embodiments, creative action journals and the included creative action records may be replayed to generate the final artwork from original machine-generated starting point. Thus, in some embodiments, the creativity associated with or contributed by each creative action record may be reviewed or evaluated.

At block 910, in one or more of the various embodiments, media creativity platforms may be arranged to generate a creativity score for the artwork.

As described above, in some embodiments, each creative action and creative action record may be associated with a creativity score (or partial creativity score) based on the type of creative action. In some embodiments, the assignment of creativity scores to creative action types may be based on experiment or observation. Likewise, in some embodiments, creativity models, or the like, may be employed evaluate creativity score assignment or allocate creativity scores to different types of creative actions.

Accordingly, in some embodiments, media creativity platforms may be arranged to traverse creative action journals to generate a cumulative creativity score for the artwork. In some embodiments, creativity scores may provide users with an easy to understand indication of the strength of the prediction or inference that the artwork may be considered a human created artwork.

Also, in some embodiments, media creativity platforms may be arranged to augment or modify the overall creativity score for an artwork based on one or more metrics that may be associated with the artwork as a whole rather than being limited to the partial creativity scores associated with the one or more creative action records. Accordingly, media creativity platforms may be configured to modify the artwork creativity score based on one or more metrics, such as one or more of a count of creative actions associated with the modified artwork, a percentage of the artwork that is modified, a count of the number of pixels that are changed in the modified artwork, a ratio of machine generate portions to human generated portions of the modified artwork, an amount of user time invested in modifying the artwork, or the like. In some embodiments, media creativity platforms may be configured to include values for such metrics in creative action journals. Further, in some embodiments, media creativity platforms may be configured to generate one or more partial creativity scores for some or all of the metrics. Thus, in some embodiments, media creativity platforms may be arranged to employ one or more of weights, threshold values, formulas, mapping functions, or the like that may be associated with each metric type to generate partial creativity scores for some or all of the metrics associated with the artwork.

At block 912, in one or more of the various embodiments, media creativity platforms may be arranged to predict creativity levels based on one or more creativity models.

As described above, in some embodiments, media creativity platforms may be arranged to predict or infer if artwork may be considered to be human created under various criteria or standards.

In some embodiments, creativity models may be trained to predict or infer human creativity levels for artwork based on creative action journals associated with the artwork. For example, creativity models may be trained using creative action journals (or synthetic creative action journals) that may be known to be associated with human created works. Accordingly, in some embodiments, creativity models may be employed to predict or infer the level of human creativity that may be associated with an artwork.

In some embodiments, media creativity platforms may be arranged to display a user interface indication of current the level of creativity for an artwork. Thus, in some embodiments, as the user works on the artwork, the media creativity platform may provide instantaneous feedback regarding if the human creative actions may be accumulating such that that the artwork may be predicted or inferred to be considered human created.

Next, in one or more of the various embodiments, control may be returned to a calling process.

Figure 10:
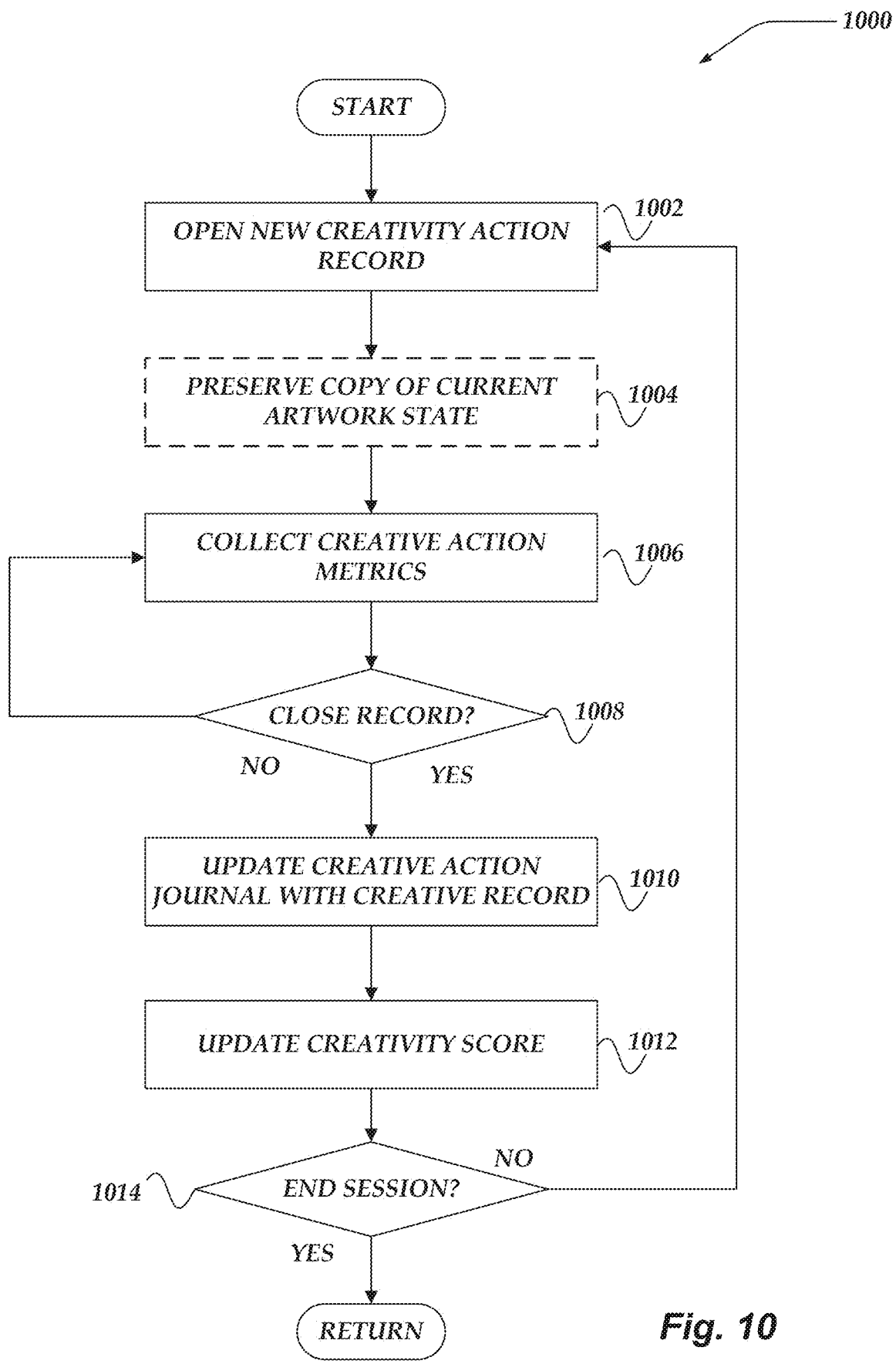
FIG. 10 illustrates a flowchart of a process for quantifying and validating human creative input in AI-generated content in accordance with one or more of the various embodiments.

FIG. 10 illustrates a flowchart of process 1000 for quantifying and validating human creative input in AI-generated content in accordance with one or more of the various embodiments. After a start block, at block 1002, in one or more of the various embodiments, media creativity platforms may be arranged to open a new creative action record.

As described above, in some embodiments, creative action records may be data structures for representing information associated with creative actions. Accordingly, in some embodiments, each creative action record may represent one or more portions of the human creativity that went into producing a final artwork.

In some embodiments, media creativity platforms may be arranged to open a new creative action record based on various conditions or criteria, including one or more of tool selection, elapsed time, manual indication by user, or the like. Accordingly, in some embodiments, media creativity platforms may be arranged to determine one or more conditions for creating a new creative action record based on rules, instructions, user preferences, or the like that may be provided via configuration information.

In some embodiments, media creativity platforms may be arranged to associate information, such as a timestamp, serial numbers, sequence number, other context information, or the like, with the newly opened creative action record.

At block 1004, in one or more of the various embodiments, optionally, media creativity platforms may be arranged to preserve a copy of the current artwork state.

In some embodiments, media creativity platforms may be employed to record a definitive record of the human creativity that has been used to create an artwork. Accordingly, in some embodiments, capturing screenshots, data snapshots, data images, or the like of the artwork before creative actions associated with the creative action record may be executed or may be captured to provide evidence of the changes that may be associated with the human creativity represented by the creative action record.

Note, this block is indicated as being optional because in some cases media creativity platforms may be configured to omit this step.

At block 1006, in one or more of the various embodiments, media creativity platforms may be arranged to collect one or more creative action metrics. As described above, in some embodiments, media creativity platforms may be arranged to track how users interact with the artwork or the media creativity platform while working on the artwork.

Accordingly, in some embodiments, media creativity platforms may be arranged to collect various metrics for each creative action. In some embodiments, the particular metrics may vary depending on the creative action type, associated tools, artwork media, or the like. For example, in some embodiments, if the creative actions may be associated with pen-like graphics tool, creative action metrics may include stroke starting point, stroke stopping point, pen color, pen tip type/width, duration of tool selection, duration of tool use, or the like. As noted above, media creativity platforms may be designed to be adaptable to supporting different tool types, artwork media, action types, or the like. Accordingly, in some embodiments, media creativity platforms may be arranged to employ rules, instructions, plug-ins, libraries, or the like, provided via configuration information to determine the particular metrics that may be collected for particular creative actions. For example, a plug-in that introduces a different tool type may include a definition or declaration of the metrics that may be associated with the tool type.

In some embodiments, media creativity platforms may be configured to associate particular partial creativity scores with particular tool types. For example, in some embodiments, creative actions associated with a tool such as a pen or pencil may be considered to evidence more creativity than a tool such as an area flood fill tool or a copy-and-paste tool because the pen or pencil tool may require human creativity for the placement or execution of each stroke rather enabling wholesale modification/changes with a single action.

At decision block 1008, in one or more of the various embodiments, if the current creative action record may be closed, control may flow to block 1010; otherwise, control may loop back block 1006.

Similar to criteria for initializing a creative action record, in some embodiments, media creativity platforms may be arranged to apply one or more criteria or conditions for determining if creative action records may be closed.

For example, in some embodiments, media creativity platforms may be arranged to close a current creative action record before opening a new creative action record. Likewise, in some embodiments, media creativity platforms may provide user interface controls that enable users to manually close a creative action record. Further, in some embodiments, user activity such as ending a work session, closing the artwork (e.g., closing the project), or the like, may trigger the media creativity platform to close the current creative action record if one may be open.

At block 1010, in one or more of the various embodiments, media creativity platforms may be arranged to update the creative action journal with the creative action record. As described above, in some embodiments, media creativity platform may be arranged to generate creative action journals that collect the creative action records associated with an artwork. Accordingly, in some embodiments, media creativity platforms may be arranged to add the closed creative action records to the creative action journal of the artwork.

At block 1012, in one or more of the various embodiments, media creativity platforms may be arranged to update the creativity score associated with the artwork.

As described above, in some embodiments, media creativity platforms may be arranged to assign creativity scores (or partial scores) with each creative action included in creative action records. Accordingly, in some embodiments, media creativity platforms may be arranged to traverse the current creative action journal of an artwork to compute a cumulative creativity score for the artwork. In some embodiments, media creativity platforms may be arranged to apply additional heuristics, sanity checks, normalization, or the like, to modify the creativity score value. For example, in some embodiments, a media creativity platform may be configured to represent creativity scores using values from 0-100 such that the score value may represent the strength of the prediction or inference that the artwork may be considered human created. Accordingly, in this example, for some embodiments, media creativity platforms may be arranged to apply one or more rules to normalize the determine creativity scores to the desired range of values.

Also, as mentioned above, in some embodiments, media creativity platforms may be arranged to collect one or more metrics associated with the modified artwork as a whole. Accordingly, in some embodiments, media creativity platforms may be arranged to modify the creativity scores for an artwork based on one or more metrics associated with the artwork rather than being limited to using the partial creativity scores associated with individual creative action records.

In some embodiments, media creativity platforms may be arranged to record or display the raw creativity scores as well depending on user preference settings.

At decision block 1014, in one or more of the various embodiments, if the creative session may be complete, control may be returned to a calling process; otherwise, control may loop back to block 1002.

In some embodiments, media creativity platforms may provide user interface controls that enable users to indicate that a creative session may be ended. Also, in some embodiments, closing a session, closing a project, or a timeout may indicate that the creative session may be ended.

Next, in one or more of the various embodiments, control may be returned to a calling process.

Figure 11:
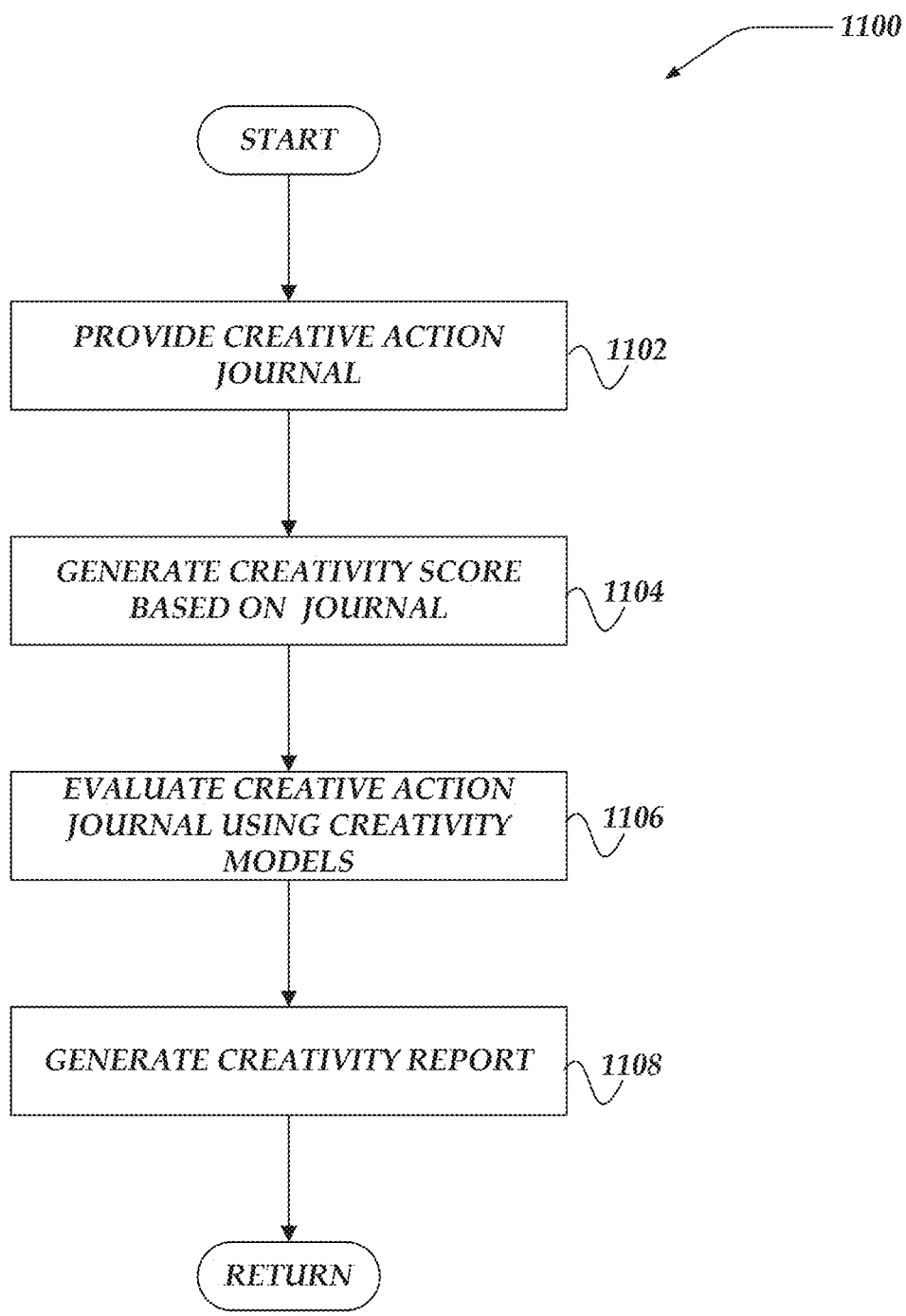
FIG. 11 illustrates a flowchart of a process for quantifying and validating human creative input in AI-generated content in accordance with one or more of the various embodiments.

FIG. 11 illustrates a flowchart of process 1100 for quantifying and validating human creative input in AI-generated content in accordance with one or more of the various embodiments. After a start block, at block 1102, in one or more of the various embodiments, media creativity platforms may be arranged to be provided a creative action journal for an artwork. As described above, in some embodiments, media creativity platforms may be arranged to generate creative action journals that include the creative action records that may be associated with an artwork or project.

At block 1104, in one or more of the various embodiments, media creativity platforms may be arranged to generate a creativity score based on the creative action journal. As described above, in some embodiments, media creativity platforms may be arranged to traverse creative action journals to generate a cumulative creativity score for the artwork based on the creativity scores associated with the creative action records that comprise the creative action journals.

At block 1106, in one or more of the various embodiments, media creativity platforms may be arranged to evaluate the creative action journal using one or more creativity models. In addition to or instead of creativity scores, media creativity platforms may be arranged to employ one or more creativity models to evaluate the human creativity level of an artwork based on its creative action journal.

Accordingly, in some embodiments, media creativity platforms may be arranged to convert creative action journal data structures to formats suitable for inputting into the particular creativity models being used. For example, in some embodiments, media creativity platforms may be arranged to generate input vectors representing an embedding of some or all of the information included in the creative action journals that may be submitted to the creativity models.

In some embodiments, creativity models may be trained to predict or infer if the creative action journal represents that the associated artwork may be considered to be human created.

Also, in some embodiments, media creativity platforms may be arranged to submit creative action journals as a whole or in part to one or more generative artificial intelligence systems. Accordingly, in some embodiments, media creativity platforms may be arranged to reformat (if necessary) creative action journals into a format that may be consumed by the one or more generative artificial intelligence systems. For example, in some embodiments, binary representations of creative action journals or creative action records may be converted to string/text representations to enable inclusion in a prompt or prompt template that may be submitted to the one or more generative artificial intelligence systems. Thus, for example, in some embodiments, the prompt may include one or more example creative action journals that are associated with human created artwork such that the generative artificial intelligence system may be asked if the actual creative action journal may appear to represent a human created artwork.

Note, in some embodiments, media creativity platforms may be arranged to be adaptable to different types of creativity models or different types of comparisons. Accordingly, in some embodiments, media creativity platforms may be arranged to employ creativity models, rules, libraries, instructions, or the like, for evaluating creative action journals from configuration information to account local circumstances or local requirements.

At block 1108, in one or more of the various embodiments, media creativity platforms may be arranged to generate creativity report. In some embodiments, creativity reports may include the predictions or inferences generated based on the creativity models and the creative action journal. Also, in some embodiments, creativity reports may include the creativity scores for the artwork. One of ordinary skill in the art will appreciate that a creativity report may take many forms or formats depending on the preferences of the user or the configuration of the media creativity platforms. In some embodiments, media creativity platforms may be configured to generate creativity reports that include a breakdown of each creative action or creative action record that may have contributed to the ultimate prediction or inference of human creativity. In other cases, for some embodiments, creativity reports may simply include a display of the creativity score. In other reports, in some embodiments, creativity reports may be interactive applications that enable users to browse through creative action records, before and after snapshots, or the like. And still further, in some cases, for some embodiments, creativity reports may include static pages that may be displayed or printed on paper, or the like.

Further, in some embodiments, media creativity platforms may be designed to be adaptable to support various types of creativity reports. Accordingly, in some embodiments, media creativity platforms may be arranged to determine the particular report formats or contents of reports based on rules, instructions, plug-ins, or the like provided via configuration information to account for local circumstances or local requirements.

Next, in one or more of the various embodiments, control may be returned to a calling process.

Figure 12:
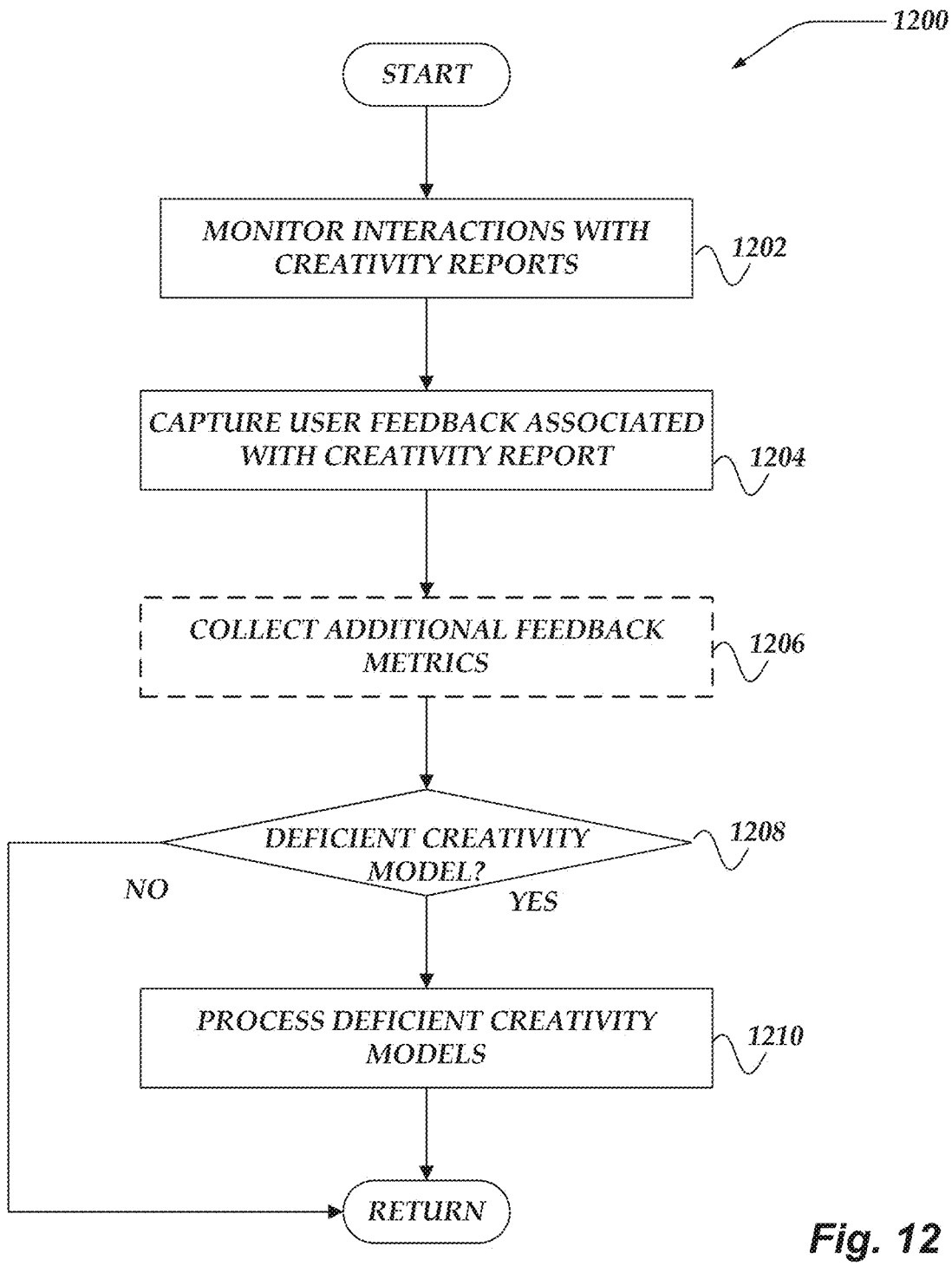
FIG. 12 illustrates a flowchart of a process for quantifying and validating human creative input in AI-generated content in accordance with one or more of the various embodiments.

FIG. 12 illustrates a flowchart of process 1200 for quantifying and validating human creative input in AI-generated content in accordance with one or more of the various embodiments. After a start block, at block 1202, in one or more of the various embodiments, media creativity platforms may be configured to monitor one or more interactions with creativity reports or creativity scores.

As described above, in some embodiments, media creativity platforms may be arranged to provide one or more user interfaces that enable users or administrators to view creativity reports or creativity scores. In some embodiments, the reports may be considered to be interactive reports that may enable users to perform various actions, including drilling down into the details of the associated creative action journals or creative action records, filtering or sorting reports or records based on various attributes or characteristics associated with the creative action journals or creative action records, grading or scoring the quality or accuracy of the creativity evaluations, or the like.

In some embodiments, media creativity platforms may be arranged to enable users to modify or design reports based on the various fields associated with the creative action records or creative action journals. For example, in some embodiments, media creativity platforms may be arranged to enable reports to be sorted, grouped, or filtered based on one or more of a user, creative tool type, creative action type, or other creative action context information included in creative action records.

In some embodiments, media creativity platforms may be arranged to provide creativity reports, creative action journals, creative action records, or associated information to other applications via one or more APIs or interfaces. Accordingly, in some embodiments, these applications may be enabled to provide the user interface for the interactive reports. In some embodiments, these applications may submit interaction metrics to the media creativity platforms via the same or similar APIs or interfaces. However, for brevity or clarity descriptions of user interfaces, interaction monitoring, or the like will be described as being provided by media creativity platforms even though other applications may be supported by APIs, or interfaces, or other integration methods.

At block 1204, in one or more of the various embodiments, media creativity platforms may be arranged to collect user feedback associated with one or more creativity reports.

As described above, in some embodiments, media creativity platforms may be arranged to provide user interfaces that enable users to provide direct feedback regarding their perceived quality of creativity reports, creativity scores, or the like. In some embodiments, user interfaces may provide controls that enable users to confirm if the creativity reports or creativity scores may be considered accurate.

Also, in some embodiments, media creativity platforms may be arranged to provide user interfaces that may enable users to submit natural language feedback regarding the creativity reports, creativity scores, or the like. Accordingly, in some embodiments, media creativity platforms may be arranged to employ NLP, large language models, or the like to evaluate the semantics or sentiment associated with the natural language feedback. Thus, in some embodiments, media creativity platforms may be arranged to determine positive or negative feedback from the submitted natural language feedback.

At block 1206, in one or more of the various embodiments, optionally, media creativity platforms may be arranged to collect additional feedback metrics.

In some embodiments, media creativity platforms may be arranged to be adaptable such that additional feedback metrics may be collected. Accordingly, in some embodiments, media creativity platforms may be arranged to employ rules, instructions, software libraries, or the like for determining the additional feedback metrics via configuration information to account for local circumstances or local requirements.

For example, in some embodiments, additional feedback metrics may be associated with particular types of artwork subjects, artwork media, tools, or the like. Likewise, in some embodiments, additional feedback metrics may be associated with particular creativity models. For example, in some embodiments, creativity models that may be considered experimental may be associated with additional feedback metrics to evaluate if those creativity models may be suitable for employing in general production.

Note, this block is indicated as being optional because in some cases media creativity platforms may not collect additional feedback metrics beyond those discussed elsewhere.

At decision block 1208, in one or more of the various embodiments, if one or more creativity models may be determined to be deficient, control may flow to block 1210; otherwise, control may be returned to a calling process. In some embodiments, media creativity platforms may be arranged to determine creativity models may be deficient based on the various feedback metrics discussed above. In some embodiments, media creativity platforms may be arranged to employ one or more formulas, heuristics, conditions, threshold values, or the like for determining if creativity models may be deficient based on the associated feedback metrics. In some embodiments, different types of feedback may be given more weight than others. For example, direct user feedback such as rejecting particular creativity scores or creativity reports may be weighed higher than passive feedback associated with user interactions with creativity reports.

At block 1210, in one or more of the various embodiments, media creativity platforms may be arranged to process the one or more deficient creativity models.

In some embodiments, media creativity platforms may be configured to performed various actions in response to the determination of deficient creativity models. For example, in some embodiments, deficient creativity models may be discarded and pulled from production. Also, in some embodiments, media creativity platforms may be arranged to automatically designate deficient creativity models for automatic retraining. Further, in some embodiments, media creativity platforms may be arranged to suspend deficient creativity models from use such that administrators may be notified of the deficient creativity models.

In some embodiments, media creativity platforms may be arranged to generate user interfaces that include reports regarding a current performance score for creativity models. Accordingly, in some embodiments, media creativity platforms may be arranged to enable administrators identify creativity models that may be degrading before they may be determined to be deficient.

Next, in one or more of the various embodiments, control may be returned to a calling process.

Figure 13:
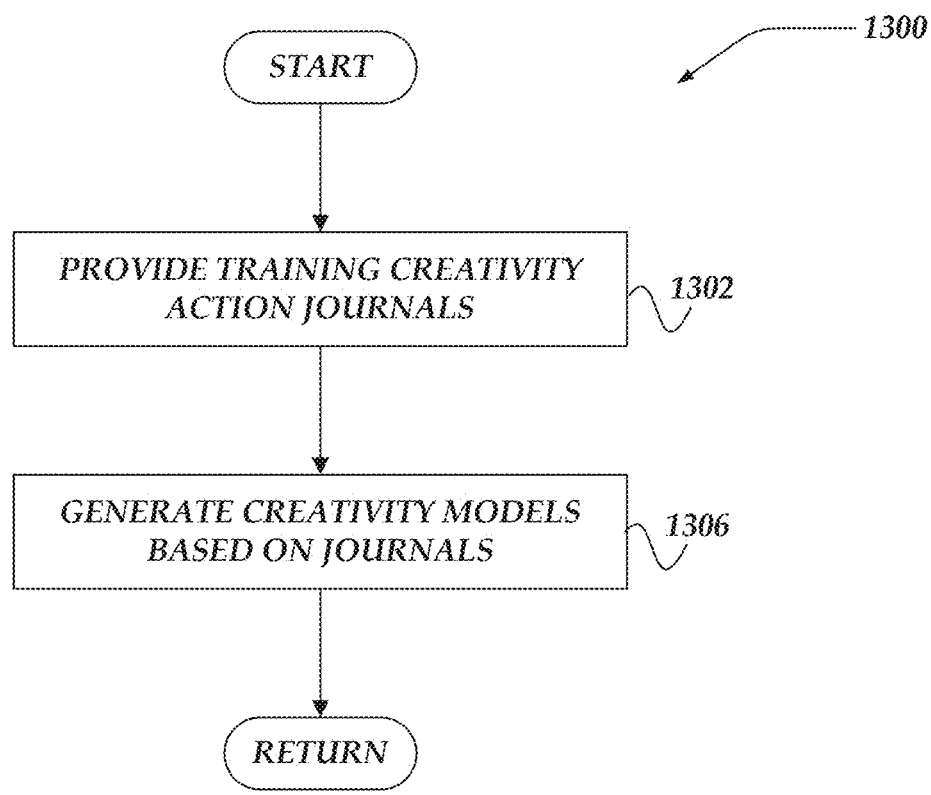
FIG. 13 illustrates a flowchart of a process for quantifying and validating human creative input in AI-generated content in accordance with one or more of the various embodiments.

FIG. 13 illustrates a flowchart of process 1300 for quantifying and validating human creative input in AI-generated content in accordance with one or more of the various embodiments. After a start block, at block 1302, in one or more of the various embodiments, media creativity platforms may be arranged to be provided one or more creative action journals for training creativity models.

As described above, in some embodiments, media creativity platforms may be arranged to train creativity models based on archived creative action journals or synthetic creative action journals. Accordingly, in some embodiments, media creativity platforms may be provided training creative action journals streamed from data stores of archived projects or from a synthetic creative action journal source.

One of ordinary skill in the art will be familiar with methods for generating synthetic creative action journals. For example, in some embodiments, programs, scripts, or the like, may be configured to generate synthetic creative action journals that conform to one or more training goals. Also, in some embodiments, media creativity platforms engines may be arranged to employ generative AI models to generate synthetic creative action journals. Further, in some cases, for some embodiments, synthetic creative action journals may be based off archived creative action journals that may be modified for a particular training.

In some embodiments, training goals may include one or more of determining similarity of creative action journals associated with existing projects that have been accepted as being human created or otherwise eligible for copyright protections, licensure requirements, or the like. Accordingly, in some embodiments, one or more creativity models may be trained to infer if the creative action journal of an artwork may predict that the artwork may be validated as being human created.

At block 1304, in one or more of the various embodiments, media creativity platforms may be arranged to generate one or more creativity models based on the training. In some embodiments, creativity models that may be trained to a defined quality, may be deployed into production environments for quantifying and validating human creative input in AI-generated content.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring one or more creative actions associated with artwork in a computing environment using one or more processors that are configured to execute instructions that cause performance of actions, comprising:
   collecting a portion of the one or more creative actions that cause one or more modifications to the artwork and includes one or more events that are indirectly associated with the one or modifications, wherein the one or more creative actions are executed by a user;
   obtaining one or more records based on the one or more creative actions, wherein each record includes one or more attributes associated with the one or more creative actions;
   obtaining a journal associated with the one or more records, wherein the journal is arranged based on one or more of a timestamp, a portion of the artwork, or a type of the one or more creative actions;
   obtaining a creativity score for the modified artwork based on the journal, wherein each record included in the journal is associated with a partial creativity score that contributes to the creativity score;
   employing one or more creativity models to collect an amount of change to the modified artwork caused by the portion of the one or more creative actions based on the creativity score and the journal; and
   obtaining an interactive user interface that includes one or more display panels with content that is dynamically transformed and arranged for display to a user based on one or more of user telemetry, user interaction and user feedback, wherein the content includes a report based on the collected amount of change, wherein one or more portions of the report are arranged for display based on the creativity score.

2. The method of claim 1, further comprising:
   collecting a second portion of the one or more creative actions based on one or more selections or deselections of one or more tools, wherein the one or more tools include one or more of a graphic editing tool, a prompt editor, prompt template editor, an audio editing tool, or a video editing tool; and
   collecting a third portion of the one or more creative actions based on one or more of a tool operation, a dwell time between tool selection, a dwell time between tool operations, an undo operation, or a redo-operation.

3. The method of claim 1, wherein collecting generating the one or more records, further comprises:
   collecting the one or more attributes associated with the one or more creative actions based on an execution of the one or more creative actions, wherein the one or more attributes include one or more of a tool name, a tool type, a tool stroke, a tool specification, an author identifier, a copy of a current version of the artwork, a reference to a copy of the current version of the artwork, a group indicator, a layer indicator, a reference to a parent record, or a reference to a child record; and
   including the one or more attributes in the one or more records.

4. The method of claim 1, further comprising:
   collecting another portion of the one or more creative actions that are associated with one or more tools;
   collecting a plurality of previously executed creative actions associated with the one or more tools;
   comparing the other portion of the one or more creative actions with the plurality of previously executed creative actions, wherein one or more anomalous creative actions in the other portion of the one or more creative actions are collected based on the comparison; and
   increasing the partial creativity score associated with a portion of the records that are associated with the one or more anomalous creative actions.

5. The method of claim 1, further comprising:
   collecting one or more metrics associated with the modified artwork, wherein the one or more metrics include one or more of a count of creative actions associated with the modified artwork, a percentage of the artwork that is modified, a count of the number of pixels are changed in the modified artwork, a ratio of a portion of the modified artwork that is machine generated, or an amount of user time expended modifying the artwork; and
   updating the creativity score for the modified artwork based on the one or more metrics.

6. The method of claim 1, wherein the artwork includes one or more of a graphic digital illustration, a digital image, a video, or a portion of digitized audio, and wherein one or more portions of the artwork are machine generated.

7. The method of claim 1, further comprising:
   collecting a plurality of journals based on a plurality of other artworks, wherein a first portion of the plurality of journals is associated with a first portion of the plurality of other artworks that are human generated, and wherein a second portion of the plurality of journals is associated with a second portion of the plurality of other artworks that are machine generated; and
   training the one or more creativity models based on the first portion of journals and the second portion of journals, wherein the one or more creativity models are trained to predict human generated artwork.

8. A network computer for monitoring one or more creative actions associated with artwork, comprising:
   a memory that stores at least instructions; and
   one or more processors that execute instructions that are configured to cause actions, including:
      collecting a portion of the one or more creative actions that cause one or more modifications to the artwork and includes one or more events that are indirectly associated with the one or modifications, wherein the one or more creative actions are executed by a user;
      obtaining one or more records based on the one or more creative actions, wherein each record includes one or more attributes associated with the one or more creative actions;
      obtaining a journal associated with the one or more records, wherein the journal is arranged based on one or more of a timestamp, a portion of the artwork, or a type of the one or more creative actions;
      obtaining a creativity score for the modified artwork based on the journal, wherein each record included in the journal is associated with a partial creativity score that contributes to the creativity score;
      employing one or more creativity models to collect an amount of change to the modified artwork caused by the portion of the one or more creative actions based on the creativity score and the journal; and
      obtaining an interactive user interface that includes one or more display panels with content that is dynamically transformed and arranged for display to a user based on one or more of user telemetry, user interaction and user feedback, wherein the content includes a report based on the collected amount of change, wherein one or more portions of the report are arranged for display based on the creativity score.

9. The network computer of claim 8, wherein the one or more processors execute instructions that are configured to cause actions, further comprising:
collecting a second portion of the one or more creative actions based on one or more selections or deselections of one or more tools, wherein the one or more tools include one or more of a graphic editing tool, a prompt editor, prompt template editor, an audio editing tool, or a video editing tool; and
collecting a third portion of the one or more creative actions based on one or more of a tool operation, a dwell time between tool selection, a dwell time between tool operations, an undo operation, or a redo-operation.

10. The network computer of claim 8, wherein obtaining the one or more records, further comprises:
collecting the one or more attributes associated with the one or more creative actions based on an execution of the one or more creative actions, wherein the one or more attributes include one or more of a tool name, a tool type, a tool stroke, a tool specification, an author identifier, a copy of a current version of the artwork, a reference to a copy of the current version of the artwork, a group indicator, a layer indicator, a reference to a parent record, or a reference to a child record; and
including the one or more attributes in the one or more records.

11. The network computer of claim 8, wherein the one or more processors execute instructions that are configured to cause actions, further comprising:
collecting another portion of the one or more creative actions that are associated with one or more tools;
collecting a plurality of previously executed creative actions associated with the one or more tools;
comparing the other portion of the one or more creative actions with the plurality of previously executed creative actions, wherein one or more anomalous creative actions in the other portion of the one or more creative actions are collected based on the comparison; and
increasing the partial creativity score associated with a portion of the records that are associated with the one or more anomalous creative actions.

12. The network computer of claim 8, wherein the one or more processors execute instructions that are configured to cause actions, further comprising:
collecting one or more metrics associated with the modified artwork, wherein the one or more metrics include one or more of a count of creative actions associated with the modified artwork, a percentage of the artwork that is modified, a count of the number of pixels are changed in the modified artwork, a ratio of a portion of the modified artwork that is machine generated, or an amount of user time expended modifying the artwork; and
updating the creativity score for the modified artwork based on the one or more metrics.

13. The network computer of claim 8, wherein the artwork includes one or more of a graphic digital illustration, a digital image, a video, or a portion of digitized audio, and wherein one or more portions of the artwork are machine generated.

14. The network computer of claim 8, wherein the one or more processors execute instructions that are configured to cause actions, further comprising:
collecting a plurality of journals based on a plurality of other artworks, wherein a first portion of the plurality of journals is associated with a first portion of the plurality of other artworks that are human generated, and wherein a second portion of the plurality of journals is associated with a second portion of the plurality of other artworks that are machine generated; and
training the one or more creativity models based on the first portion of journals and the second portion of journals, wherein the one or more creativity models are trained to predict human generated artwork.

15. A processor readable non-transitory storage media that includes instructions configured for monitoring one or more creative actions associated with artwork in a computing environment, wherein execution of the instructions by one or more processors on one or more network computers performs actions, comprising:
collecting a portion of the one or more creative actions that cause one or more modifications to the artwork and includes one or more events that are indirectly associated with the one or modifications, wherein the one or more creative actions are executed by a user;
obtaining one or more records based on the one or more creative actions, wherein each record includes one or more attributes associated with the one or more creative actions;
obtaining a journal associated with the one or more records, wherein the journal is arranged based on one or more of a timestamp, a portion of the artwork, or a type of the one or more creative actions;
obtaining a creativity score for the modified artwork based on the journal, wherein each record included in the journal is associated with a partial creativity score that contributes to the creativity score;
employing one or more creativity models to collect an amount of change to the modified artwork caused by the portion of the one or more creative actions based on the creativity score and the journal; and
obtaining an interactive user interface that includes one or more display panels with content that is dynamically transformed and arranged for display to a user based on one or more of user telemetry, user interaction and user feedback, wherein the content includes a report based on the collected amount of change, wherein one or more portions of the report are arranged for display based on the creativity score.

16. The media of claim 15, further comprising:
collecting a second portion of the one or more creative actions based on one or more selections or deselections of one or more tools, wherein the one or more tools include one or more of a graphic editing tool, a prompt editor, prompt template editor, an audio editing tool, or a video editing tool; and
collecting a third portion of the one or more creative actions based on one or more of a tool operation, a dwell time between tool selection, a dwell time between tool operations, an undo operation, or a redo-operation.

17. The media of claim 15, wherein generating the one or more records, further comprises:
collecting the one or more attributes associated with the one or more creative actions based on an execution of the one or more creative actions, wherein the one or more attributes include one or more of a tool name, a tool type, a tool stroke, a tool specification, an author identifier, a copy of a current version of the artwork, a reference to a copy of the current version of the artwork, a group indicator, a layer indicator, a reference to a parent record, or a reference to a child record; and including the one or more attributes in the one or more records.

18. The media of claim 15, further comprising:
collecting another portion of the one or more creative actions that are associated with one or more tools;
collecting a plurality of previously executed creative actions associated with the one or more tools;
comparing the other portion of the one or more creative actions with the plurality of previously executed creative actions, wherein one or more anomalous creative actions in the other portion of the one or more creative actions are collected based on the comparison; and
increasing the partial creativity score associated with a portion of the records that are associated with the one or more anomalous creative actions.

19. The media of claim 15, further comprising:
collecting one or more metrics associated with the modified artwork, wherein the one or more metrics include one or more of a count of creative actions associated with the modified artwork, a percentage of the artwork that is modified, a count of the number of pixels are changed in the modified artwork, a ratio of a portion of the modified artwork that is machine generated, or an amount of user time expended modifying the artwork; and
updating the creativity score for the modified artwork based on the one or more metrics.

20. The media of claim 15, wherein the artwork includes one or more of a graphic digital illustration, a digital image, a video, or a portion of digitized audio, and wherein one or more portions of the artwork are machine generated.

21. The media of claim 15, further comprising:
collecting a plurality of journals based on a plurality of other artworks, wherein a first portion of the plurality of journals is associated with a first portion of the plurality of other artworks that are human generated, and wherein a second portion of the plurality of journals is associated with a second portion of the plurality of other artworks that are machine generated; and
training the one or more creativity models based on the first portion of journals and the second portion of journals, wherein the one or more creativity models are trained to predict human generated artwork.

22. A system for method for monitoring one or more creative actions associated with artwork, comprising:
a network computer, comprising:
a memory that stores at least instructions; and
one or more processors that execute instructions that are configured to cause actions, including:
collecting a portion of the one or more creative actions that cause one or more modifications to the artwork and includes one or more events that are indirectly associated with the one or modifications, wherein the one or more creative actions are executed by a user;
obtaining one or more records based on the one or more creative actions, wherein each record includes one or more attributes associated with the one or more creative actions;
obtaining a journal associated with the one or more records, wherein the journal is arranged based on one or more of a timestamp, a portion of the artwork, or a type of the one or more creative actions;
a creativity score for the modified artwork based on the journal, wherein each record included in the journal is associated with a partial creativity score that contributes to the creativity score;
employing one or more creativity models to collect an amount of change to the modified artwork caused by the portion of the one or more creative actions based on the creativity score and the journal; and
obtaining an interactive user interface that includes one or more display panels with content that is dynamically transformed and arranged for display to a user based on one or more of user telemetry, user interaction and user feedback, wherein the content includes a report based on the collected amount of change, wherein one or more portions of the report are arranged for display based on the creativity score; and
a client computer, comprising:
another memory that stores at least instructions; and
one or more other processors that execute other instructions that are configured to cause actions, including:
displaying the report.

23. The system of claim 22, wherein the one or more processors of the network computer execute instructions that are configured to cause actions, further comprising:
collecting a second portion of the one or more creative actions based on one or more selections or deselections of one or more tools, wherein the one or more tools include one or more of a graphic editing tool, a prompt editor, prompt template editor, an audio editing tool, or a video editing tool; and
collecting a third portion of the one or more creative actions based on one or more of a tool operation, a dwell time between tool selection, a dwell time between tool operations, an undo operation, or a redo-operation.

24. The system of claim 22, wherein obtaining the one or more records, further comprises:
collecting the one or more attributes associated with the one or more creative actions based on an execution of the one or more creative actions, wherein the one or more attributes include one or more of a tool name, a tool type, a tool stroke, a tool specification, an author identifier, a copy of a current version of the artwork, a reference to a copy of the current version of the artwork, a group indicator, a layer indicator, a reference to a parent record, or a reference to a child record; and
including the one or more attributes in the one or more records.

25. The system of claim 22, wherein the one or more processors of the network computer execute instructions that are configured to cause actions, further comprising:
collecting another portion of the one or more creative actions that are associated with one or more tools;
collecting a plurality of previously executed creative actions associated with the one or more tools;
comparing the other portion of the one or more creative actions with the plurality of previously executed creative actions, wherein one or more anomalous creative actions in the other portion of the one or more creative actions are collected based on the comparison; and increasing the partial creativity score associated with a portion of the records that are associated with the one or more anomalous creative actions.

26. The system of claim 22, wherein the one or more processors of the network computer execute instructions that are configured to cause actions, further comprising:
   collecting one or more metrics associated with the modified artwork, wherein the one or more metrics include one or more of a count of creative actions associated with the modified artwork, a percentage of the artwork that is modified, a count of the number of pixels are changed in the modified artwork, a ratio of a portion of the modified artwork that is machine generated, or an amount of user time expended modifying the artwork; and
   updating the creativity score for the modified artwork based on the one or more metrics.

27. The system of claim 22, wherein the artwork includes one or more of a graphic digital illustration, a digital image, a video, or a portion of digitized audio, and wherein one or more portions of the artwork are machine generated.

28. The system of claim 22, wherein the one or more processors of the network computer execute instructions that are configured to cause actions, further comprising:
   collecting a plurality of journals based on a plurality of other artworks, wherein a first portion of the plurality of journals is associated with a first portion of the plurality of other artworks that are human generated, and wherein a second portion of the plurality of journals is associated with a second portion of the plurality of other artworks that are machine generated; and
   training the one or more creativity models based on the first portion of journals and the second portion of journals, wherein the one or more creativity models are trained to predict human generated artwork.

* * * * *